United States Patent
Newman, Jr. et al.

(10) Patent No.: US 6,674,248 B2
(45) Date of Patent: Jan. 6, 2004

(54) ELECTRONIC BALLAST

(75) Inventors: Robert C. Newman, Jr., Emmaus, PA (US); Stuart DeJonge, Riegelsville, PA (US); Mark Taipale, Harleysville, PA (US); Dominick Travaglini, Doylestown, PA (US); Joel S. Spira, Coopersburg, PA (US)

(73) Assignee: Lutron Electronics Co., Inc., Coopersburg, PA (US)

(*) Notice: Subject to any disclaimer, the term of this patent is extended or adjusted under 35 U.S.C. 154(b) by 0 days.

(21) Appl. No.: 10/006,021

(22) Filed: Dec. 5, 2001

(65) Prior Publication Data

US 2003/0001522 A1 Jan. 2, 2003

Related U.S. Application Data

(63) Continuation-in-part of application No. 09/887,848, filed on Jun. 22, 2001.

(51) Int. Cl.$^7$ .......................... H05B 41/16; H05B 37/02
(52) U.S. Cl. ....................... 315/247; 315/291
(58) Field of Search ................................ 315/219, 226, 315/247 A, 209 V, 307, DIG. 2, DIG. 4, DIG. 5, DIG. 7

(56) References Cited

U.S. PATENT DOCUMENTS

| | | | | |
|---|---|---|---|---|
| 5,185,560 A | * | 2/1993 | Nilssen | 315/219 |
| 5,434,480 A | * | 7/1995 | Bobel | 315/224 |
| 5,568,041 A | * | 10/1996 | Hesterman | 323/207 |
| 5,621,279 A | * | 4/1997 | Nilssen | 315/247 |
| 5,757,166 A | * | 5/1998 | Sodhi | 323/222 |
| 5,994,847 A | | 11/1999 | Konopka | |
| 6,061,259 A | | 5/2000 | DeMichele | |

OTHER PUBLICATIONS

Kheraluwala M. H. et al. "Modified Valley Fill High Power Factor Electronic Ballast For Compact Fluorescent Lamps" Power Electronics Specialists Conference, 1995 PESC '95 Record, 26$^{th}$ Annual IEEE Atlanta, GA, USA Jun. 18–22, 1995, New York, N.Y. Jun. 18, 1995, pp. 10–14.

Pehpany S. "Mosfet Switch Provides Efficient AC/DC Conversion" EDN Electrical Design News, Chaners Publishing Co., Newton, MA, US Vo. 45, Feb. 17, 2000 pp. 149.

Alanso J.M. et al. "Evaluation of a Novel Single–Stage High–Power–Factor Electronic Ballast Based on Integrated Buck Half–Bridge Resonant Inverter" Applied Power Electronics Conference and Exposition, 2000. Feb. 6, 2002 pp. 610–616.

Ribas J. et al. "A New Discharge Lamp Ballast Based On a Self–Oscillating full–Bridg Inverter Integrated With a Buck– Type PFC Circuit" Applied Power Elctronics Conference, New York, N.Y. vol. 2 of 2, conf. 16—Mar. 4, 2001 pp. 688–694.

* cited by examiner

Primary Examiner—Don Wong
Assistant Examiner—Minh D A
(74) Attorney, Agent, or Firm—Ostrolenk, Faber, Gerb & Soffen, LLP

(57) ABSTRACT

An electronic ballast for driving a gas discharge lamp includes a rectifier, a valley-fill circuit, an inverter having first and second series-connected controllably conductive device having complementary duty cycles, a control circuit for controlling the controllably conductive device, and an independent cat ear power supply to provide power to the ballast control circuits. The result is a ballast having substantially improved THD, and current crest factor. In a preferred embodiment, the valley-fill circuit includes an energy storage device that stores energy in response to a controllably conductive device. In an especially preferred embodiment, the controllably conductive device of the valley-fill circuit is also one of the controllably conductive devices of the inverter.

47 Claims, 26 Drawing Sheets

ELECTRONIC BALLAST

RELATED APPLICATIONS

This application is related to and is a continuation-in-part of copending application Ser. No. 09/887,848, filed Jun. 22, 2001, entitled Electronic Ballast and is related to copending application Ser. No. 10/006,036, filed Dec. 5, 2001, entitled Single Switch Electronic Ballast (P/10-584), the entire disclosure of which is incorporated by reference herein.

FIELD OF THE INVENTION

The present invention relates to electronic ballasts for gas discharge lamps, such as fluorescent lamps.

BACKGROUND OF THE INVENTION

Electronic ballasts for fluorescent lamps typically can be analyzed as comprising a "front end" and a "back end". The front end typically includes a rectifier for changing alternating current (AC) line voltage to a direct current (DC) bus voltage and a filter circuit for filtering the DC bus voltage. The filter circuit typically comprises an energy storage capacitor. Electronic ballasts also often use a boost circuit for boosting the magnitude of the DC bus voltage. Additionally, an electronic ballast is known that uses passive power factor correction means to reduce ballast input current total harmonic distortion. These means include line frequency filter circuits having a high impedance at line frequency and about the first 30 harmonics of the line frequency. The high impedance of line frequency filter circuits have a significant reducing effect on ballast input current total harmonic distortion. These filters are in contrast to EMI filters which have low impedance at line frequency and the related harmonics and therefore have no significant effect on ballast input current total harmonic distortion.

The ballast back end typically includes a switching inverter for converting the DC bus voltage to a high-frequency AC voltage, and a resonant tank circuit having a relatively high impedance for coupling the high-frequency AC voltage to the lamp electrodes. The ballast back end also typically includes a feedback circuit that monitors the lamp current and generates control signals to control the switching of the inverter so as to maintain a desired lamp current magnitude.

In order to maintain stable lamp operation, typical prior art electronic ballasts filter the DC bus voltage to minimize the amount of bus voltage ripple. This is usually accomplished by providing a bus capacitor having a relatively large capacitance and hence, a relatively large energy storage capacity. By providing a relatively large bus capacitor, the amount of decay from the rectified peak voltage is minimized from one half-cycle to the next half-cycle. Minimizing the amount of ripple on the DC bus also tends to minimize the current crest factor (CCF) of the lamp current. The CCF of the lamp current is defined as the ratio of the magnitude of the peak lamp current to the magnitude of the root-mean-square (RMS) value of the lamp current.

$$CCF \equiv \frac{I_{pk}}{I_{RMS}} \quad \text{(Equation 1)}$$

An important indicator of lamp current quality for a gas discharge lamp such as a fluorescent lamp is the current crest factor (CCF) of the lamp current. A low CCF is preferred because a high CCF can cause the deterioration of the lamp filaments which would subsequently reduce the life of the lamp. A CCF of 2.1 or less is recommended by Japanese Industrial Standard (JIS) JIS C 8117-1992, and a CCF of 1.7 or less is recommended by the International Electrotechnical Commission (IEC) Standard 921-1988-07.

However, using a relatively large bus capacitor to minimize ripple on the DC bus voltage comes with its disadvantages. The larger the bus capacitor, the more expensive it is, and the more area it consumes on a printed circuit board, or the like, and the more volume it uses within the ballast. Also, the bus capacitor is discharging whenever the bus voltage level is above the instantaneous absolute value of the AC line voltage, and hence the bus capacitor recharges only during a relatively short time within each line half-cycle, around the absolute value peak voltage of the AC line voltage. Thus, typical prior art ballasts draw a relatively large amount of current during the short time that the bus capacitor is charging, as shown in FIG. 1. This results in a distorted ballast input current waveform giving rise to unwanted harmonics and undesirable levels of total harmonic distortion (THD).

In an AC power system, the voltage or current wave shapes may be expressed as a fundamental and a series of harmonics. These harmonics have some multiple frequency of the fundamental frequency of the line voltage or current. Specifically, the distortion in the AC wave shape has components which are integer multiples of the fundamental frequency. Of particular concern are the harmonics that are multiples of the $3^{rd}$ harmonic. These harmonics add numerically in the neutral conductor of a three phase power system. Typically, total harmonic distortion is calculated using the first 30 harmonics of the fundamental frequency. Total harmonic distortion (THD) of the ballast input current is preferred to be below 33.3% to prevent overheating of the neutral wire in a three phase power system. Further, many users of lighting systems require ballasts to have a ballast input current total harmonic distortion of less than 20%.

One approach to lowering the ballast input current total harmonic distortion and improving the ballast power factor has been to employ well known active power factor correction (APFC) circuits. This approach has certain tradeoffs including added ballast complexity, more components, greater cost, potentially lower reliability and, possibly, increased power consumption. Moreover, the ballast with APFC typically uses a relatively large bus capacitor with its attendant disadvantages as noted above.

Another approach to lowering ballast input current total harmonic distortion has been to employ a valley fill circuit between a rectifier and an inverter. One disadvantage of typical prior art valley fill circuits is that they can have greater bus ripple, which results in even higher lamp current crest factor, which can in turn shorten lamp life.

Prior art approaches to providing electronic ballasts having improved power factor and THD are discussed in T.-F. Wu, Y.-J. Wu, C.-H. Chang and Z. R. Liu, "Ripple-Free, Single-Stage Electronic Ballasts with Dither-Booster Power Factor Corrector", IEEE Industry Applications Society Annual Meeting, pp.2372–77, 1997; Y.-S. Youn, G. Chae, and G.-H. Cho, "A Unity Power Factor Electronic Ballast for Fluorescent Lamp having Improved Valley Fill and Valley Boost Converter", IEEE PESC97 Record, pp. 53–59, 1997; and G. Chae, Y.-S. Youn, and G.-H. Cho, "High Power Factor Correction Circuit using Valley Charge-Pumping for Low Cost Electronic Ballasts", IEEE 0-7803-4489-8/98, pp. 2003-8, 1998.

Prior art patents representative of attempts to provide electronic ballasts having improved power factor and total harmonic distortion include U.S. Pat. No. 5,387,847, "Passive Power Factor Ballast Circuit for the Gas Discharge Lamps", issued Feb. 7, 1995 to Wood; U.S. Pat. No. 5,399,944, "Ballast Circuit for Driving Gas Discharge", issued Mar. 21, 1995 to Konopka et al.; U.S. Pat. No. 5,517,086, "Modified Valley Fill High Power Factor Correction Ballast", issued May 14, 1996 to El-Hamamsy et al.; and U.S. Pat. No. 5,994,847, "Electronic Ballast with Lamp Current Valley-fill Power Factor Correction", issued Nov. 30, 1999.

Another reference is "Fluorescent Ballast Design Using Passive P.F.C. and Crest Factor Control" by Peter M. Wood, 1998. This reference shows a ballast of the type employing a line frequency filter having a substantial impedance at the line frequency and about the first 30 harmonics of the line frequency.

SUMMARY OF THE INVENTION

In accordance with a first feature of the invention, a novel electronic ballast for driving a gas discharge lamp includes a rectifying circuit to convert an AC line input voltage to a rectified voltage, a valley fill circuit including an energy storage device which is charged through a switched impedance, the energy in this device being used to fill the valleys between successive rectified voltage peaks to produce a valley filled voltage, and an inverter circuit having series connected controllably conductive devices to convert the valley filled voltage to a high frequency AC voltage. The energy storage device can be a capacitor or an inductor or any other energy storage component or combination of components. Charging the energy storage device refers to increasing the energy stored in the energy storage device. A controllably conductive device is a device whose conduction can be controlled by an external signal. These controllably conductive devices include devices such as metal oxide semi-conductor field effect transistors (MOSFETs), insulated gate bi-polar transistors (IGBTs), bi-polar junction transistors (BJTs), Triacs, SCRs, relays, switches, vacuum tubes and other switching devices. The high frequency AC voltage is applied to a resonant tank circuit for driving a current through a gas discharge lamp, and a control circuit is provided for controlling the conduction of the controllably conductive devices in a novel way to deliver a desired lamp current to the gas discharge lamp and a reduced total harmonic distortion of the ballast input current. The electronic ballast of the invention described can drive more than one gas discharge lamp.

In a preferred embodiment of the ballast, the energy storage device of the valley fill circuit includes a capacitor, commonly referred to as the valley fill capacitor, that stores energy during a first charging portion of each half-cycle of the AC line voltage, and delivers energy to the inverter circuit which in turn drives lamp current through a gas discharge lamp during a second discharge portion of each half-cycle of the AC line voltage. The switched impedance of the valley fill circuit includes a resistor in series with a controllably conductive device, through which the valley fill capacitor is charged.

In an alternative embodiment, the energy storage device of the valley fill circuit includes a valley fill capacitor, and the switched impedance includes an inductor in series with a controllably conductive device, connected together in a buck converter circuit configuration. The valley fill capacitor stores energy during a first charging portion of each half-cycle of the AC line voltage, and delivers energy to the inverter circuit during a second discharge portion of each half-cycle of the AC line voltage. The buck circuit inductor stores energy in response to conduction of the controllably conductive device during the charging period of the valley fill capacitor, and transfers the stored energy to the valley fill capacitor in response to non-conduction of the controllably conductive device during the charging period of the valley fill capacitor.

In an alternative embodiment, the buck circuit inductor is provided with a tap connected to the bus voltage through a commutation diode to provide different charge and discharge times for the valley fill capacitor.

In accordance with a second feature of the invention, a novel electronic ballast for driving a gas discharge lamp includes a rectifying circuit to convert an AC line input voltage to a full wave rectified voltage, a valley fill circuit to fill the valleys between successive rectified voltage peaks to produce a valley filled voltage, an inverter circuit having series-connected switching devices (controllably conductive devices) to convert the valley filled voltage to a high-frequency AC voltage, a resonant tank for coupling the high-frequency AC voltage to a gas discharge lamp, a control circuit for controlling the conduction of the controllably conductive devices to deliver a desired current to the gas discharge lamp, and means for drawing input current near the zero crossing of the AC line input voltage so that the ballast input current total harmonic distortion is reduced.

In a preferred embodiment of the ballast, the means for drawing current near the zero crossing is a cat ear circuit. Preferably the cat ear circuit is a cat ear power supply that may also supply the power necessary to operate the control circuit or other housekeeping and auxiliary circuits. The cat ear circuit draws current from the AC line around the zero crossing of the AC line voltage at either the leading edge of each half-cycle, or the trailing edge of each half-cycle, or both. The cat ear circuit derives its name from the characteristic shape of its input current waveform. This current "fills in" or supplements the current waveform drawn by the ballast from the AC line around the zero voltage crossings. The cat ear circuit may be provided with circuitry that "cuts in" and "cuts out" the cat ear circuit in response to fixed input voltage levels. Alternatively, the cat ear circuit may be provided with circuitry to monitor the current drawn by the ballast back end and cause the cat ear circuit to draw input current only when the back end is not drawing significant current.

DETAILED DESCRIPTION OF EMBODIMENTS OF THE INVENTION

Figure 1:
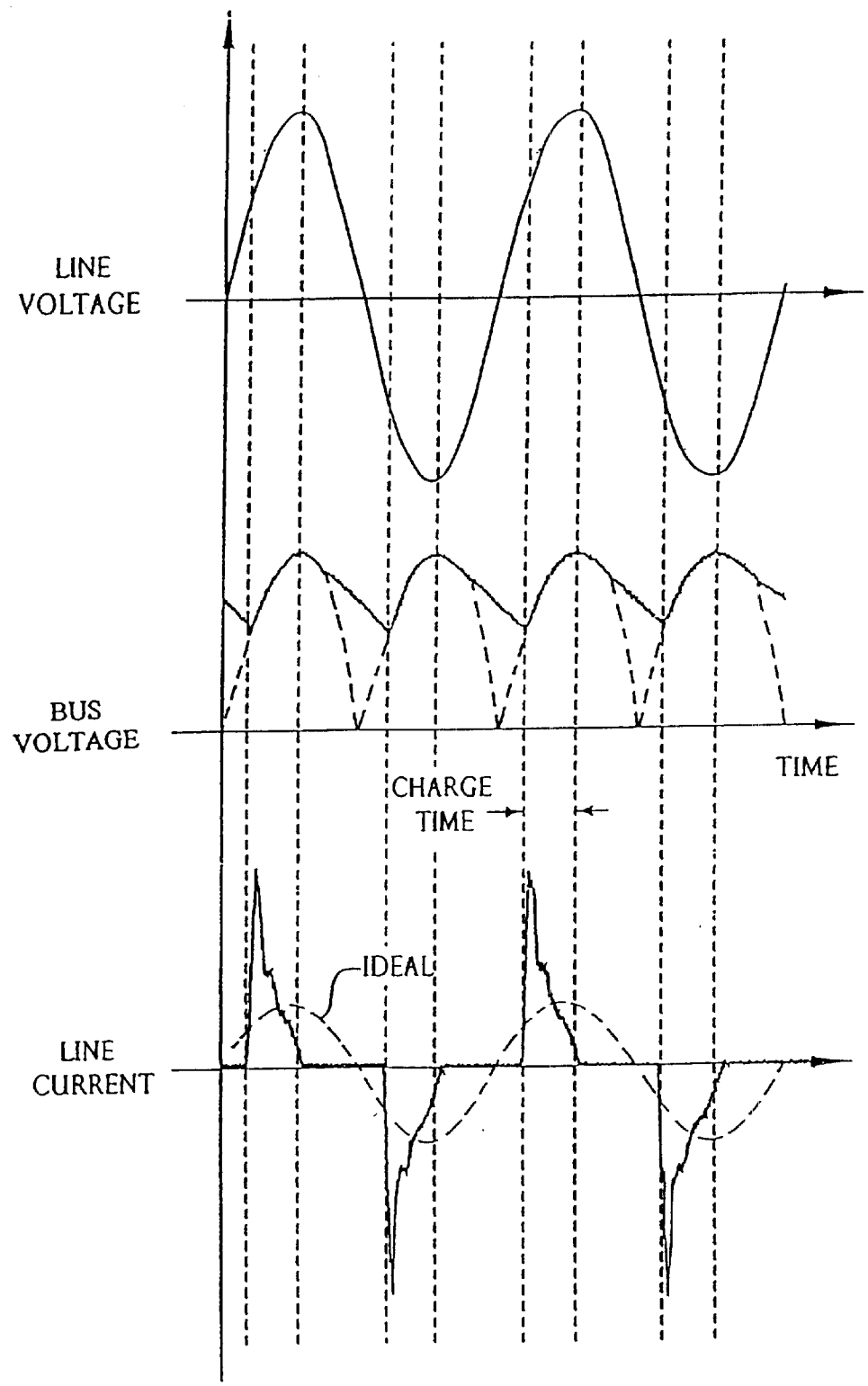
FIG. 1 is a representation of voltage and current waveforms in a prior art electronic ballast with no APFC or valley fill circuits with some idealized waveforms shown as dashed lines.

The foregoing summary, as well as the following detailed description of the preferred embodiments, is better understood when read in conjunction with the appended drawings. For the purposes of illustrating the invention, there is shown in the drawings an embodiment that is presently preferred, in which like numerals represent similar parts throughout the several views of the drawings, it being understood, however, that the invention is not limited to the specific methods and instrumentalities disclosed.

Ballast Overview

Figure 2:
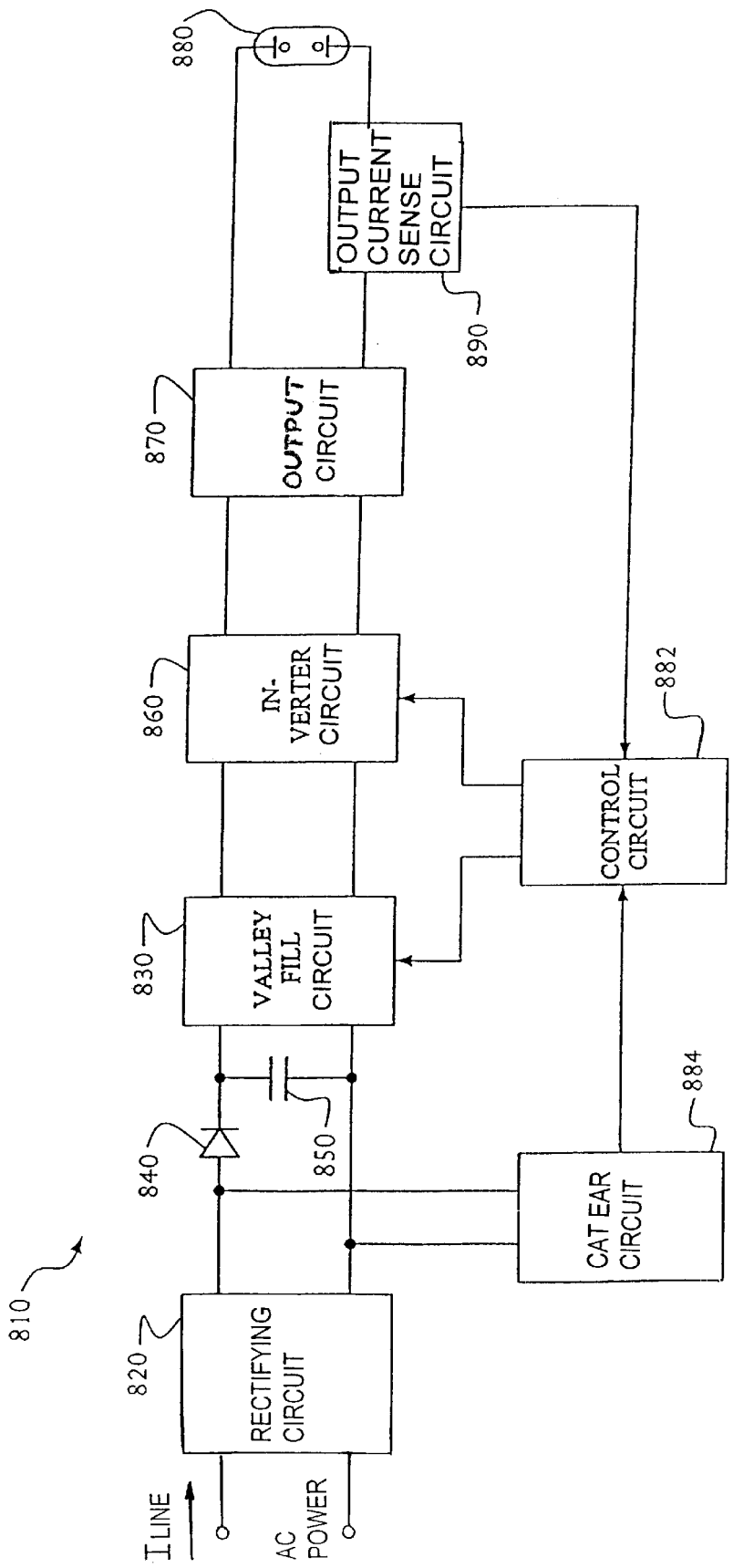
FIG. 2 is a simplified block diagram of one of embodiment of the electronic ballast of the invention.

Referring first to FIG. 2, there is shown a simplified block diagram of an electronic ballast 810 constructed in accordance with the invention. The ballast 810 includes a rectifying circuit 820 capable of being connected to an AC power supply with a given line frequency. Typically, the given line frequency of the AC power supply is 50 Hz or 60 Hz. However, the invention is not limited to these particular frequencies. Whenever a device is said to be connected, coupled, coupled in current relation, or connectable to another device, it means that the device may be directly connected by a wire or alternately, connected through another device such as (but not limited to) a resistor, diode, controllable conductive device, and this connection may be in a series or parallel arrangement. The rectifying circuit 820 converts the AC input voltage to a full wave rectified voltage. In one embodiment of the invention rectifying circuit 820 is connected to a novel valley fill circuit 830, to be described, through a diode 840. A high frequency bypass filter capacitor 850 is connected across the input terminals of the valley fill circuit 830. The valley fill circuit 830 selectively charges and discharges an energy storage device to be described, so as to create a valley filled voltage. The output terminals of the valley fill circuit 830 are in turn connected to the input terminals of an inverter circuit 860. The inverter circuit 860 converts the rectified DC voltage to a high-frequency AC voltage. The output terminals of the inverter circuit 860 are connected to an output circuit 870, which typically includes a resonant tank, and may also include a coupling transformer. The output circuit 870 filters the inverter circuit 860 output to supply essentially a sinusoidal high frequency voltage, as well as provides voltage gain and increased output impedance. The output circuit 870 is capable of being connected to drive a load 880 such as a gas discharge lamp; for example, a fluorescent lamp. An output current sense circuit 890 coupled to the load 880 provides load current feedback to a control circuit 882. The control circuit 882 generates control signals to control the operation of the valley fill circuit 830 and the inverter circuit 860 so as to provide a desired load current to the load 880. A cat ear circuit 884 is connected across the output terminals of the rectifying circuit 820 and provides the necessary power for proper operation of the control circuit 882.

The Valley Fill Circuit

Figure 3:
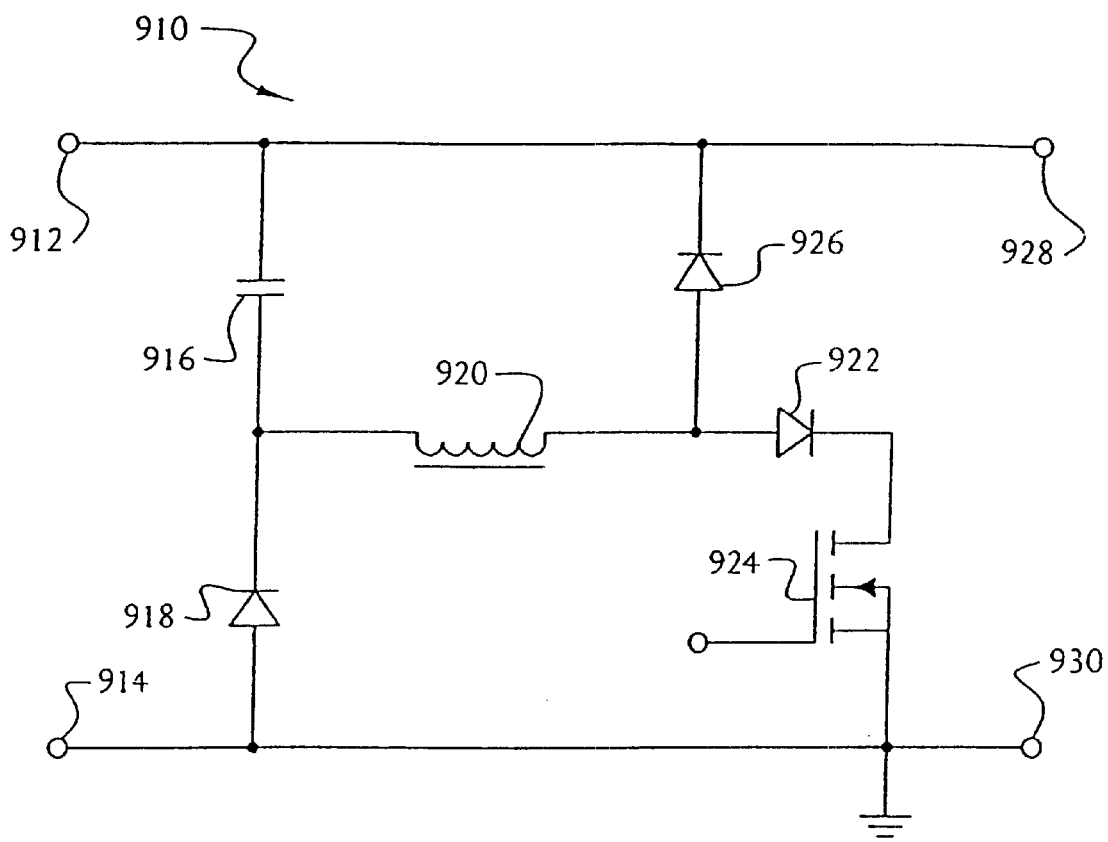
FIG. 3 is a simplified schematic circuit diagram of a first embodiment of a valley fill circuit using a buck converter circuit which can be used in the electronic ballast of the invention.
Figure 4:
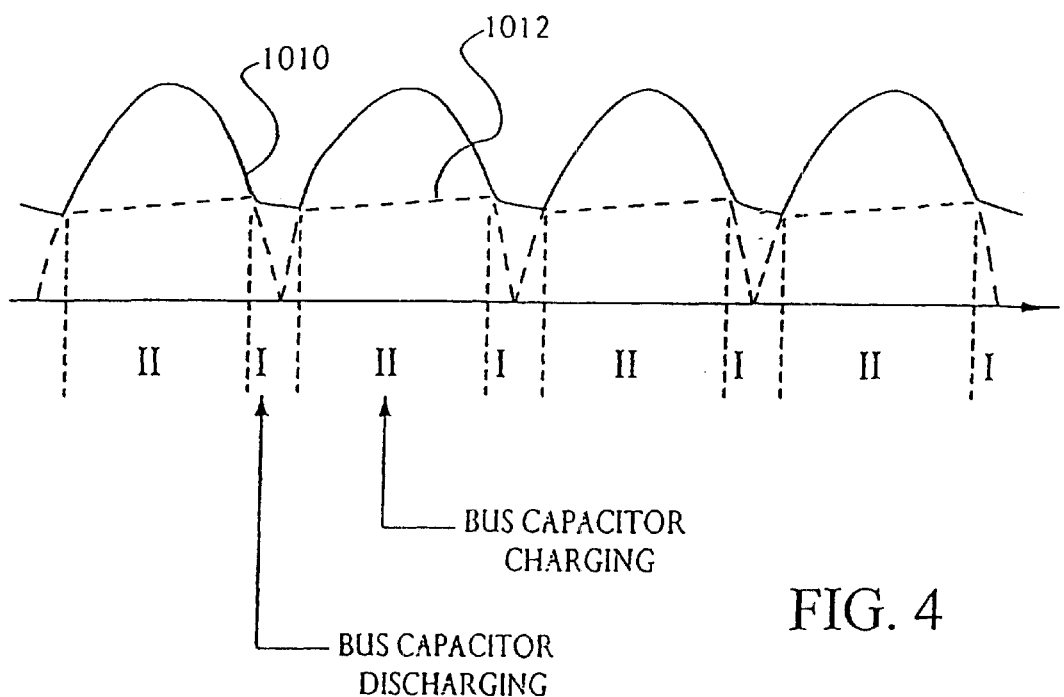
FIG. 4 is a simplified representation of the valley filled voltage in the buck converter circuit of FIG. 3 illustrating the method of operation.

Turning now to FIG. 3, there is shown a schematic circuit diagram of a first embodiment 910 of the valley fill circuit 830 of FIG. 2 in the form of a buck converter circuit. Connected across first and second input terminals 912 and 914 is an energy-storage device 916, in the form of a capacitor, in series with a first diode 918. The function of the buck converter circuit 910 is to provide a controlled charging current for the capacitor 916. This capacitor 916 is also referred to as the valley fill capacitor. Connected to the junction of the capacitor 916 and the cathode of the first diode 918 is an inductor 920 which is connected in series with a second (optional) diode 922 and a controllably conductive device, switch 924, to a circuit common. Controllably conductive device 924 is shown as a metal-oxide semiconductor field-effect transistor (MOSFET), but may be a bipolar junction transistor (BJT), insulated gate bipolar transistor (IGBT), or other controllably conductive device. The buck converter circuit 910 also includes a third commutating diode 926, which may also be a suitably controlled synchronous rectifier or MOSFET, connected between the junction of the buck inductor 920 and the second diode 922, and one terminal of the capacitor 916 connected to the input 912. A first output terminal 928 is connected to input terminal 912, capacitor 916, and the cathode of commutating diode 926. A second output terminal 930 is connected to the second input terminal 914, circuit common, the anode of diode 918, and the switch 924.

The operation of the buck converter circuit 910 will be described in connection with FIGS. 3, 4, 5, and 6. The buck converter circuit 910 operates under two different conditions. In condition I (interval I in FIG. 4), the instantaneous rectified line voltage 1010 applied to the input terminals 912, 914 of the buck converter circuit 910 is equal to or less than the voltage 1012 across the capacitor 916, and the capacitor 916 is therefore discharging some of its stored energy into the inverter circuit. In this condition, the diode 840 (FIG. 2) is reverse biased, and the diode 918 is forward biased into conduction. This establishes a discharge path for the capacitor 916 from circuit common terminal 930, through the diode 918 and the capacitor 916, to the buck converter output terminal 928. Switch 924 alternately opens and closes at a frequency typically about 30 kHz or greater, which is substantially greater than the frequency of the rectified line voltage. When the switch 924 is conducting, residual energy remaining in the buck inductor 920 from the previous charging cycle is discharged through the diode 922 and the switch 924 to circuit common. Thereafter, the diodes 922 and 926 are reverse biased so that no further current flows through the buck inductor 920.

In condition II (interval II in FIG. 4), the instantaneous rectified line voltage is greater than the voltage across the capacitor 916, and the capacitor 916 is increasing its stored energy. During interval II, the operation of the buck converter depends on the conduction state of the switch 924.

Figures 5, 6:
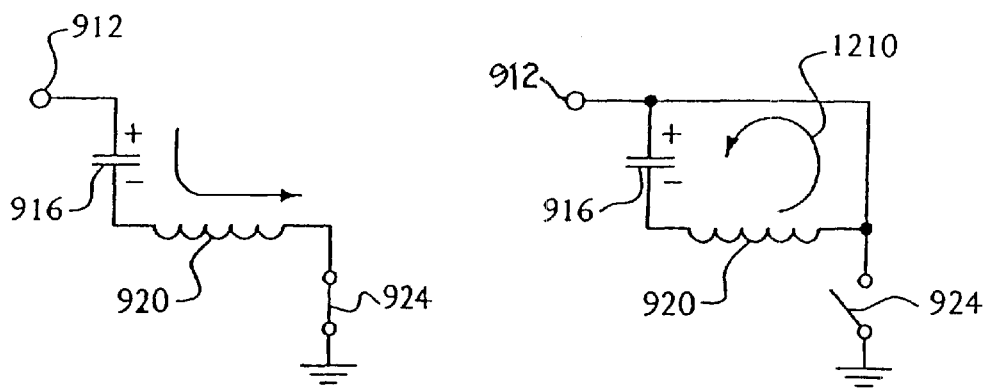
FIG. 5 is a simplified schematic circuit of the buck converter circuit of FIG. 3 illustrating a first mode of operation.
FIG. 6 is a simplified schematic circuit diagram of the buck converter circuit of FIG. 3 illustrating a second mode of operation.

When the switch 924 is conducting, the buck converter circuit 910 reduces to the simplified form shown in FIG. 5 and the voltage across the buck inductor 920 is equal to the instantaneous rectified line voltage minus the voltage across the capacitor 916. Thus, the capacitor 916 is charged by a current flowing from the input 912, through the capacitor 916, the buck inductor 920, and the switch 924, to circuit common. In addition, the energy is stored in buck inductor 920 by the voltage applied to the buck inductor 920 when switch 924 is conducting. When the switch 924 is not conducting (as depicted in FIG. 6), then the current 1210 flowing through the buck inductor 920 commutates through the diode 926 and flows into the capacitor 916, thus transferring some or all of the energy stored in buck inductor 920 to the capacitor 916. Note that in condition II, the capacitor 916 is charging both when switch 924 is conducting, and when switch 924 is not conducting.

Figure 7:
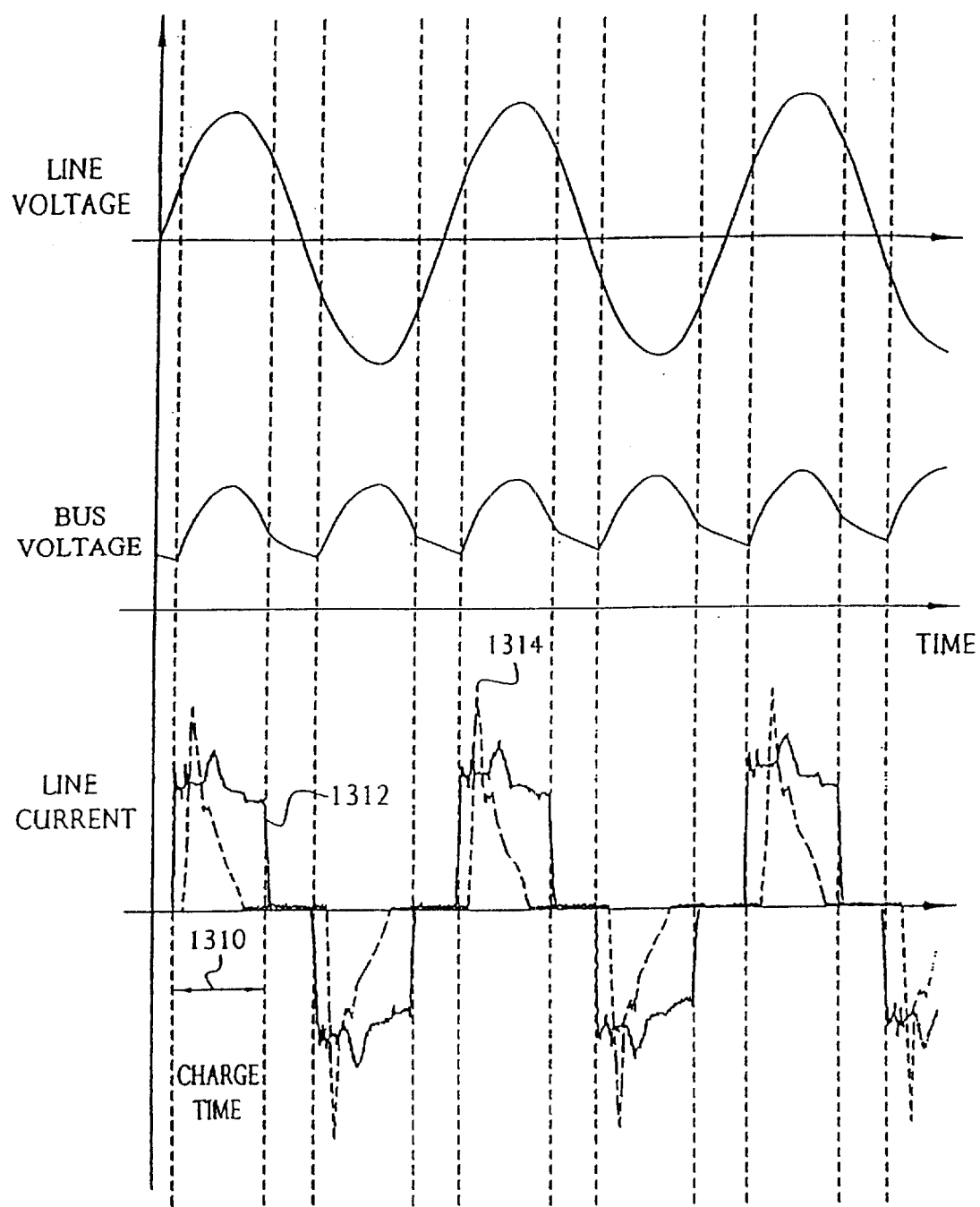
FIG. 7 is a simplified representation of various voltage and current waveforms in an electronic ballast including the buck converter circuit of FIG. 3 at full light output.

The result of the operation of the buck converter circuit 910 is that the capacitor 916 charges over a period of time 1310, as shown in FIG. 7 wherein the ballast is operating at full light output. The charging of the valley fill capacitor 916 preferably takes place over more than 90 degrees of each line half cycle.

When the charging of the valley fill capacitor takes place for greater than 90 degrees of each 180 degree line frequency half cycle, the resulting ballast input current total harmonic distortion has been found to be reduced.

Another advantage of the buck converter circuit 910 is that the inrush current to the capacitor 916 at the beginning of each charge cycle is limited by the buck inductor 920. This can also be seen in FIG. 7 in that the peak line current 1312 is greatly reduced as compared to the peak line current 1314 of typical prior art ballasts having no active power factor correction (APFC) or valley fill circuitry. Current inrush limiting is even more significant at initial ballast turn-on. Thus, when power is first applied to a typical active power factor corrected ballast, the energy storage capacitor is charged until the capacitor voltage rises to the peak value of the AC line voltage. During this charging period the input current is essentially limited only by wire resistance and the impedance of the AC power source supplying the ballast. The buck converter circuit 910 of the ballast of the invention is inherently current limited, thereby overcoming another significant drawback to APFC type ballasts.

Another advantage of the buck converter circuit 910 is that it provides over-voltage protection for the capacitor 916. That is, in an unloaded condition, such as when no lamp is connected, the capacitor 916 will charge to no more than the peak rectified line voltage. This is in contrast to traditional boost and buck-boost converters wherein extra circuitry must be added to prevent charging of the energy storage capacitor to potentially catastrophically high voltages in an unloaded condition.

Figure 8:
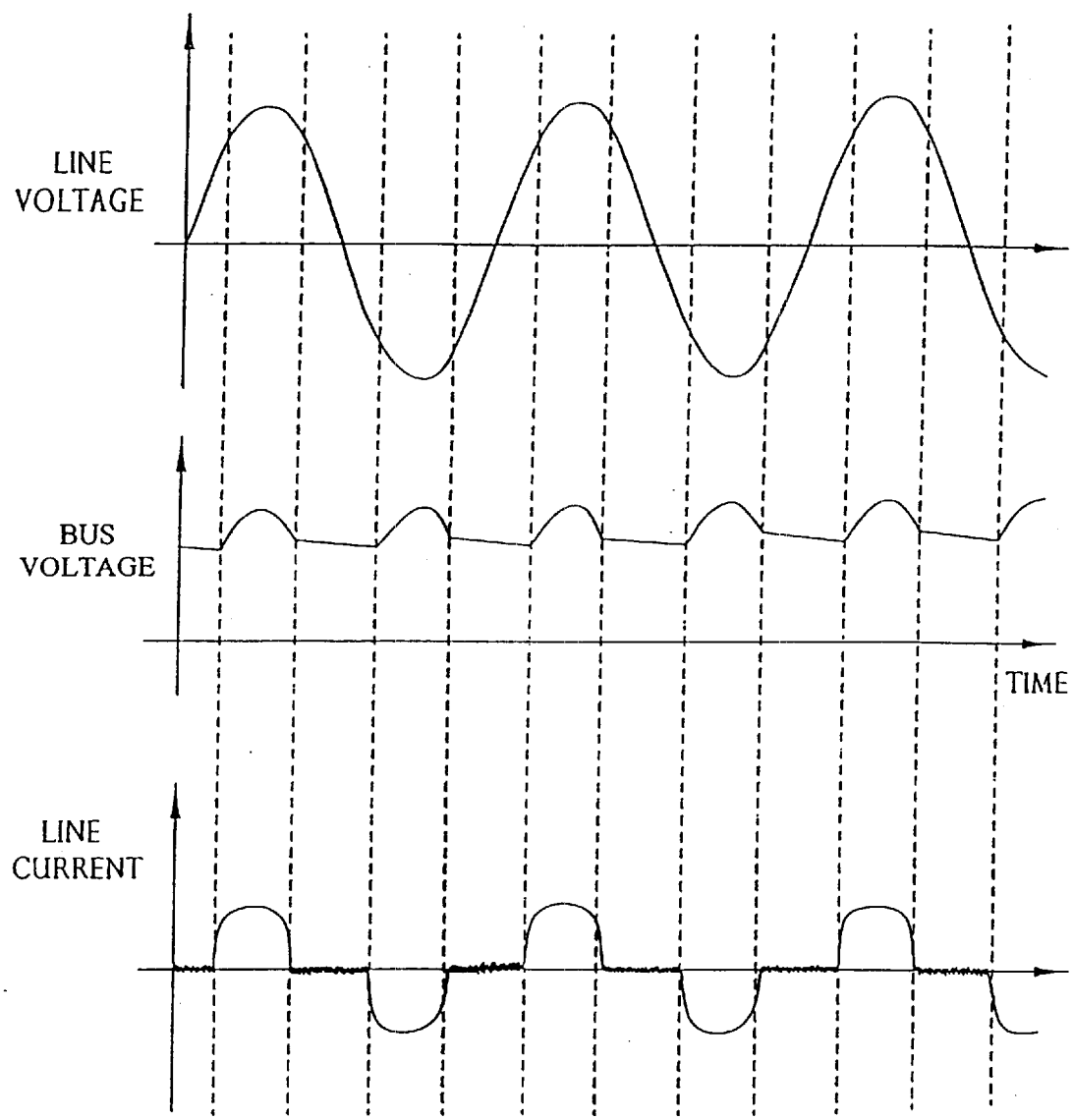
FIG. 8 is a simplified representation of various voltage and current waveforms in an electronic ballast including the buck converter circuit of FIG. 3 at ten percent light output.

As shown in FIG. 8, as the lamp is dimmed down to about 10 percent light output, the charging time of the capacitor 916 decreases. Simultaneously, the bus ripple voltage is also reduced, leading to a lower current crest factor of the lamp current.

Figure 9:
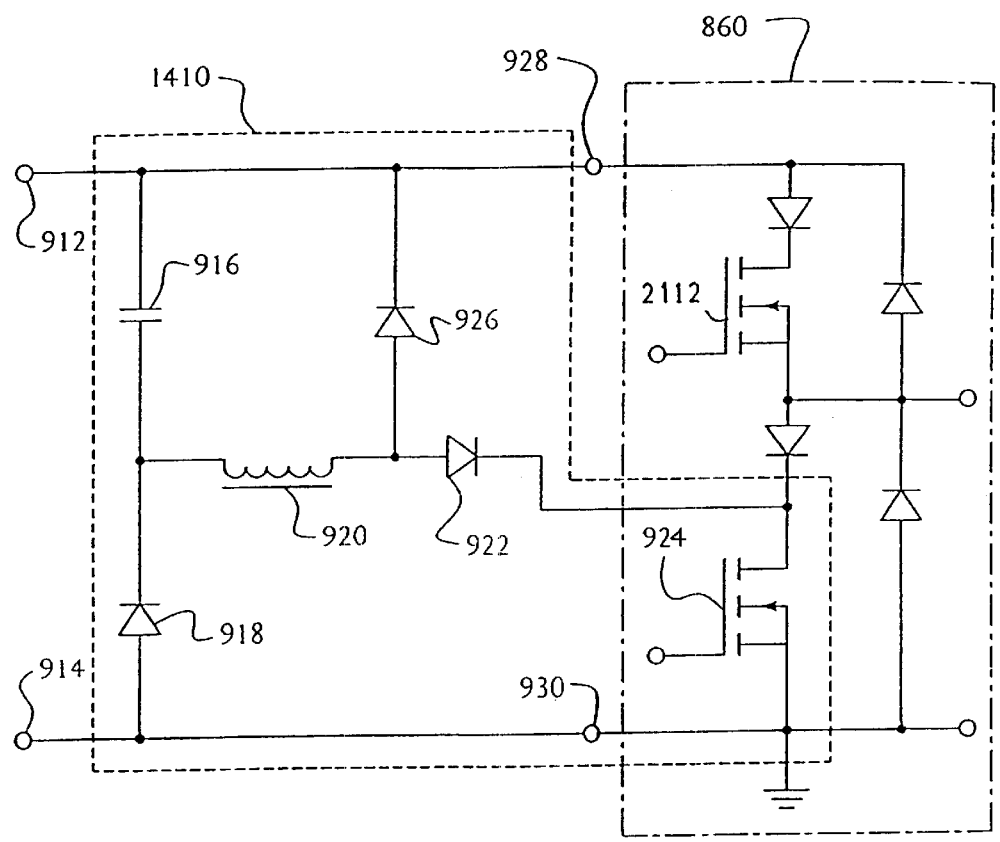
FIG. 9 is a simplified schematic circuit diagram of a second embodiment of a valley fill circuit having a buck converter circuit integrated with an inverter circuit in accordance with the present invention.

Turning now to FIG. 9, there is shown a second embodiment of the buck converter circuit 1410 with inverter circuit 860. The inverter circuit 860, which is described later in more detail, has a high side switch 2112 and a low side switch 924. The high side switch 2112 and the low side switch 924 are both controllably conductive devices, such as MOSFETs or IGBTs. In this embodiment, the buck converter circuit 1410 and the inverter circuit 860 share the controllably conductive device 924. The second embodiment of buck converter circuit 1410 otherwise operates essentially in the same way as the first embodiment of buck converter circuit 910.

Figure 10:
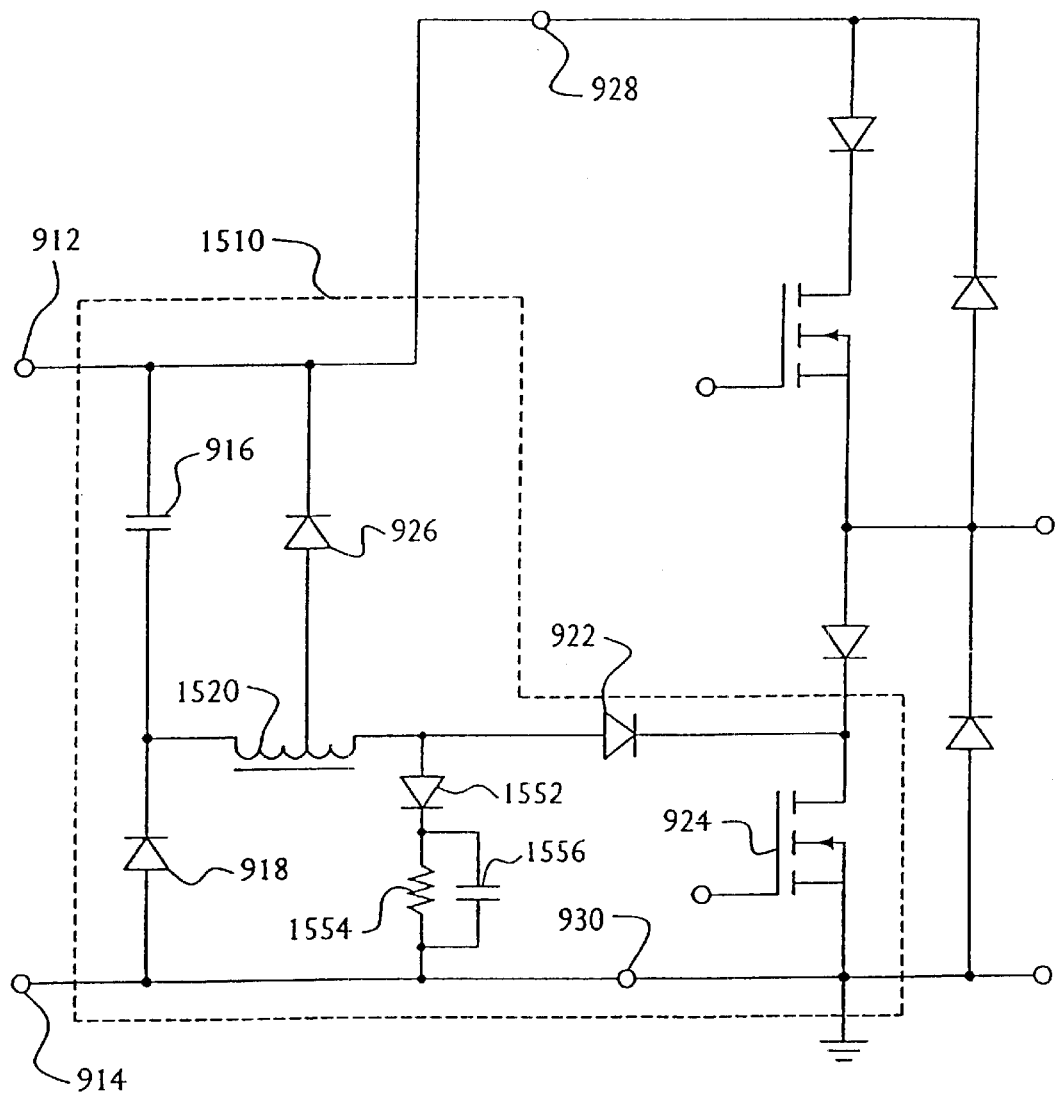
FIG. 10 is a simplified schematic circuit diagram of a third embodiment of a valley fill circuit having an integrated buck converter circuit with a tapped inductor in the buck converter circuit in accordance with the invention.

Turning now to FIG. 10, there is shown a third embodiment of the buck converter circuit 1510 in which the buck inductor 920 is replaced with a tapped inductor 1520. The anode of the commutation diode 926 is coupled to an interior coil of the tapped inductor 1520 at the tap, rather than the junction of the tapped inductor 1520 and the diode 922. The inductor tap placement provides the capability to vary the discharge time of the inductor 1520. The continuous mode operation of the buck converter may be reduced, or eliminated altogether. However, this extra flexibility comes with the tradeoff of extra voltage stress on the switch 924. Thus, when the tapped inductor 1520 is transferring energy to the capacitor 916, the tapped inductor 1520 acts so that the voltage applied across the switch 924 is equal to the voltage across the capacitor 916 multiplied by the turns ratio of the tapped inductor 1520. A snubber circuit including a snubber diode 1552, in series with the parallel combination of a snubber resistor 1554 and a snubber capacitor 1556, is coupled between the junction of the tapped buck inductor 1520 and the diode 922, and circuit common, to dissipate uncoupled residual energy in the tapped buck inductor.

In one embodiment of the tapped buck inductor circuit of FIG. 10, capacitor 916 is a parallel combination of two 47 microfarad, 250 volt capacitors, diodes 918 and 926 are MUR160 diodes, diodes 922 and 1552 are 1000 volt, 1 ampere diodes, resistor 1554 is a series combination of two 91 kilohm, 1 watt resistors, capacitor 1556 is a 0.0047 microfarad, 630 volt capacitor, and switch 924 is a 250 volt IRFI634G MOSFET. The tapped buck inductor 1520 has a total number of about 180 turns from the cathode of diode 918 to the anode of diode 922, and has an inductance of about 1.427 milliHenries, with the number of turns from the cathode of diode 918 to the tap being about 75, with an inductance of about 244 microHenries, and the number of turns from the tap to the anode of diode 922 being about 105, with an inductance of about 492 microHenries.

In each of the previously described embodiments of the valley fill circuit 830 (FIG. 2), charging current of capacitor 916 increases with longer conduction times of the controllably conductive switch 924. When the lamp is being dimmed to low light levels, the switch 924 conducts for a longer time, and the accumulation of charge on capacitor 916 increases, which tends to raise the bus voltage. It is advantageous to have higher bus voltage at low light levels since the lamp voltage increases at low light levels and a higher bus voltage allows the lamp to be driven through a higher impedance. Higher output impedance improves lamp stability, as is discussed in U.S. Pat. No. 5,041,763, issued Aug. 20, 1991 to Sullivan et al., and assigned to Lutron Electronics Co., Inc.

The charging current also increases as the voltage differential between the rectified line voltage and the voltage across the capacitor 916 increases. This results in the instantaneous charging current in the tapped buck inductor being highest in the middle of the line half cycle, and lower towards the tails of the line half cycle, which in turn results in reduced total harmonic distortion of the ballast input current.

Figure 11:
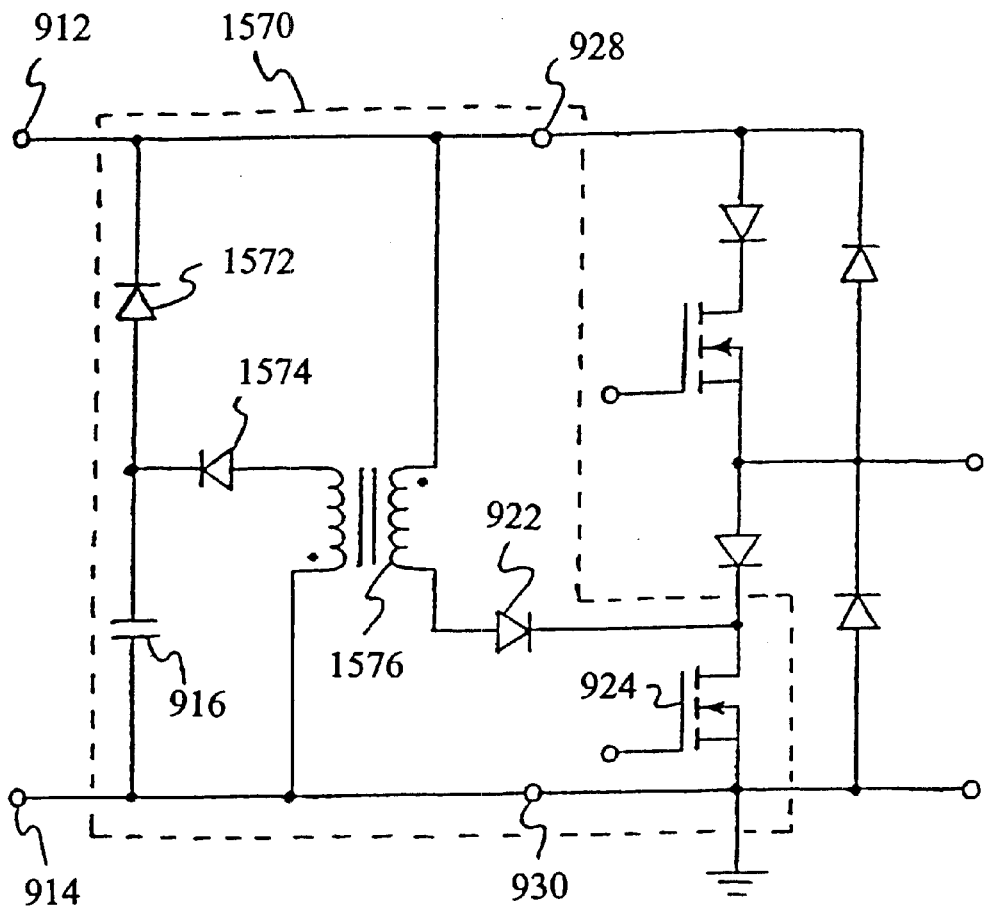
FIG. 11 is a simplified schematic circuit diagram of another alternative embodiment of a valley fill circuit having a flyback transformer for recharging the valley fill capacitor.

Turning now to FIG. 11, there is shown another embodiment 1570 of a valley fill circuit. In this embodiment, the valley fill circuit 1570 includes, in addition to the capacitor 916, the diode 922, and the switch 924, a diode 1572 connected between the capacitor 916 and the terminal 912, a diode 1574 and a "flyback" transformer 1576. The "primary" winding of the transformer 1576 is connected between the anode of the diode 922 and the terminal 928 of the valley fill circuit 1570. The "secondary" winding of the transformer 1576 is connected between circuit common and to the anode of the diode 1574, the cathode of which is in turn connected to the junction of the capacitor 916 and the anode of the diode 1572.

When a rectified line voltage applied to terminals 912, 914 in FIG. 11 exceeds the voltage across the capacitor 916, then the voltage developed across the "secondary" winding of the flyback transformer 1576 recharges the capacitor 916 through the diode 1574. When the rectified line voltage falls below the voltage across the capacitor, then the capacitor 916 discharges through output terminals 928 and 930.

Figure 12:
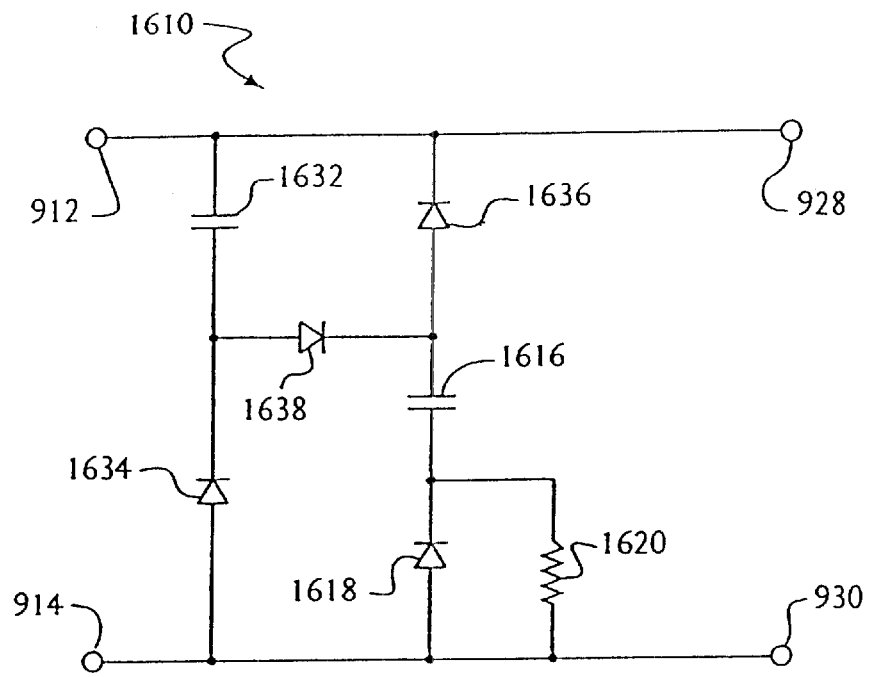
FIG. 12 is a simplified schematic circuit diagram of a fourth embodiment of a valley fill circuit in accordance with the present invention.

Turning now to FIG. 12, there is shown a fourth embodiment 1610 of a valley fill circuit which uses only capacitive energy storage. In this embodiment, the valley fill circuit 1610 includes a first energy storage capacitor 1632 connected in series with a first diode 1634 across first and second input terminals 912, 914 to the circuit 1610. A second energy storage capacitor 1616 is connected in series with a second diode 1636, the cathode of which is tied to the input 912. A third diode 1638 is connected between the junction of capacitor 1632 and diode 1634, and the junction of capacitor 1616 and diode 1636. The other terminal of energy storage capacitor 1616 is connected to the second input terminal 914 by means of a fourth diode 1618 in parallel with a resistor 1620.

When a rectified line voltage applied to terminals 912, 914 exceeds the sum of the voltages across the capacitors 1632 and 1616 by the forward voltage drop across the diode 1638, then the diodes 1634, 1636, and 1618 are reverse biased, the diode 1638 is forward biased, and the energy storage capacitors 1632, 1616 charge through the series path of capacitor 1632, diode 1638, capacitor 1616, and resistor 1620. Resistor 1620 limits the charging current into the energy storage capacitors 1632, 1616 to reduce current spikes in the current drawn by the ballast from the line, thereby reducing the ballast input current total harmonic distortion. The capacitors 1632, 1616 typically each have the same value and charge to approximately one-half the peak input voltage.

When a rectified line voltage applied to terminals 912, 914 falls below the sum of the voltage across capacitors 1632, 1616, then diode 1638 is reverse biased. Once the voltage across the input terminals 912, 914 falls below the voltage across the capacitor 1632 by more than the turn-on voltage of the diode 1634, then capacitor 1632 discharges through diode 1634 and output terminals 928 and 930. Once the voltage across the input terminals 912, 914 falls below the voltage across the capacitor 1616 by more than the turn-on voltage of the diode 1636, then capacitor 1616 discharges through the diode 1636, the resistor 1620, and the output terminals 928, 930. When the voltage drop across the resistor 1620 exceeds the turn-on voltage of the diode 1618, then capacitor 1616 discharges through diodes 1636, 1618 and the output terminals 928, 930.

In summary, the capacitors 1632, 1616 charge in series, and discharge in parallel, delivering their stored energy to an inverter circuit which drives the gas discharge lamp. The amount of ripple in the bus voltage is thereby reduced, which in turn leads to improved current crest factor of the lamp current delivered by the ballast.

The valley fill circuit 1610 of FIG. 12 differs significantly from the valley fill circuit of Wood in U.S. Pat. No. 5,387, 847. Most notably, Wood, in FIG. 2 of his patent, shows a resistor in series with a diode connected between two capacitors. In contrast, the valley fill circuit of FIG. 12 provides the resistor 1620 in parallel with the diode 1618, the pair connected between the capacitor 1616 and circuit common. This novel arrangement provides the desired improvement in ballast input current total harmonic distortion, but does so in a manner that more readily lends itself to additional improvements.

Figure 13:
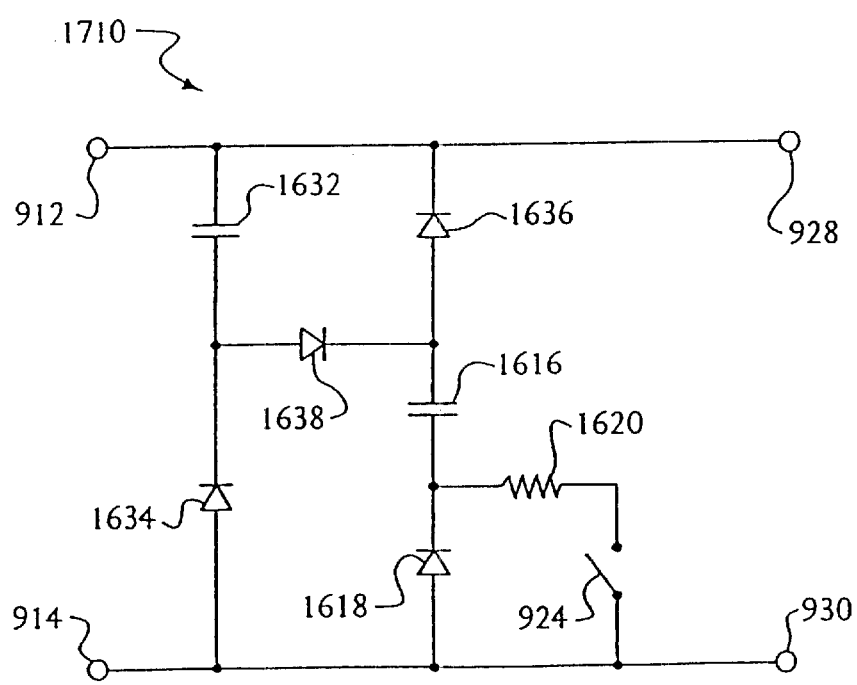
FIG. 13 is a simplified schematic circuit diagram of a fifth embodiment of a valley fill circuit in accordance with the present invention.

To further improve the ballast input current total harmonic distortion, the valley fill circuit 1610 of FIG. 12 may be modified by placing a controllably conductive device 924 in series with the resistor 1620 as shown in FIG. 13. This creates a switched resistor circuit. The controllably conductive device 924 will typically be operated at a high frequency, that is, many times greater than the fundamental frequency of the AC line voltage. The ballast input current total harmonic distortion may be improved by controlling the conduction of switch 924 so that the conduction time of the switch 924 is increased near the center or peak of each line half cycle. This results in a ballast input current waveform that more nearly matches the AC line voltage waveform.

Figure 14:
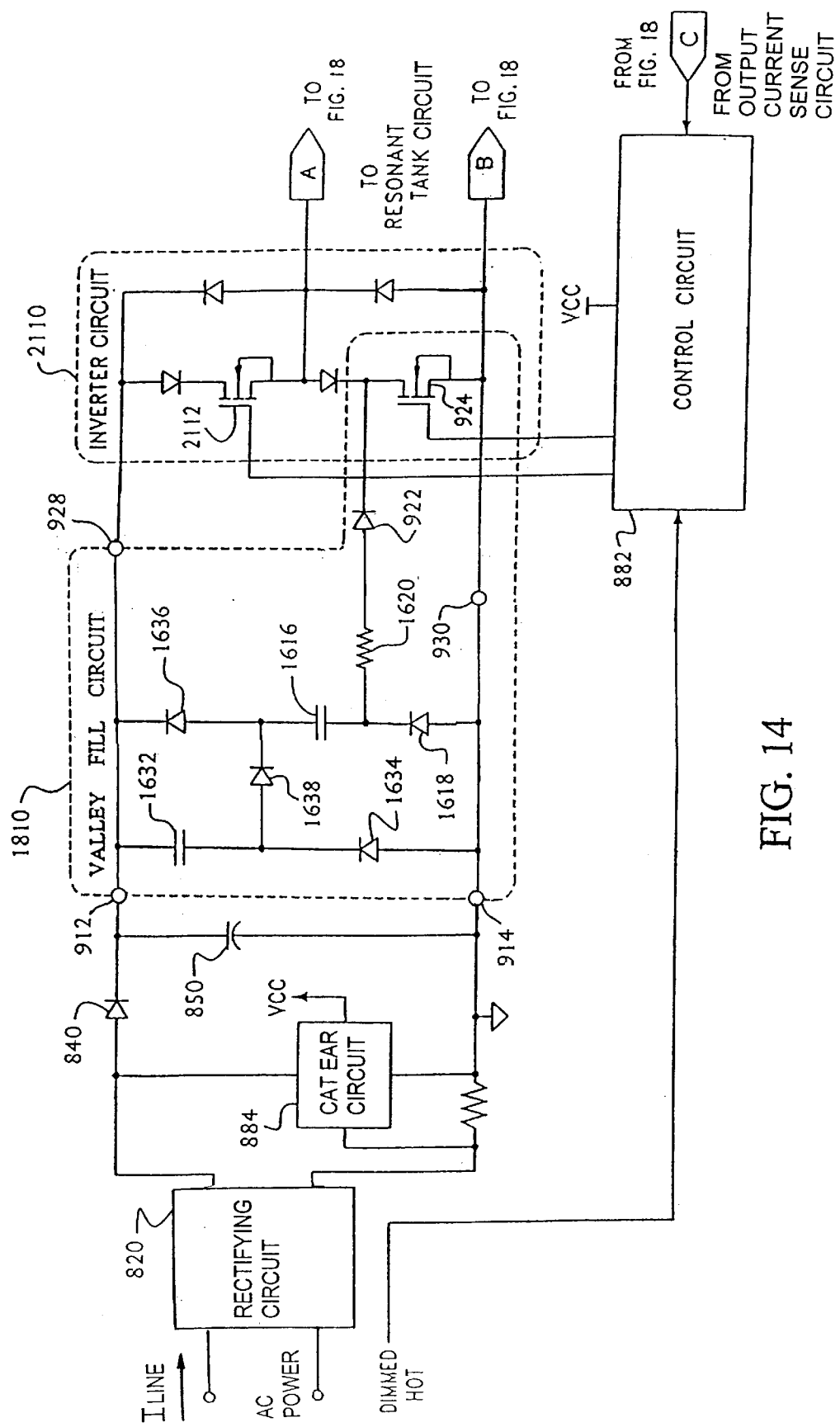
FIG. 14 is a simplified schematic circuit diagram of a sixth embodiment of a valley fill circuit integrated with an inverter circuit in accordance with the present invention.

The valley fill circuit 1710 of FIG. 13 may be integrated with the ballast inverter circuit as shown in FIG. 14 wherein the controllably conductive device 924 is shared by the valley-fill circuit 1810 and the inverter circuit 2110. Alternately, the switch 924 of the valley fill circuit 1710 of FIG. 13 may be an independently controlled controllably conductive device separate from each of the switches in the inverter circuit 860.

Figure 15:
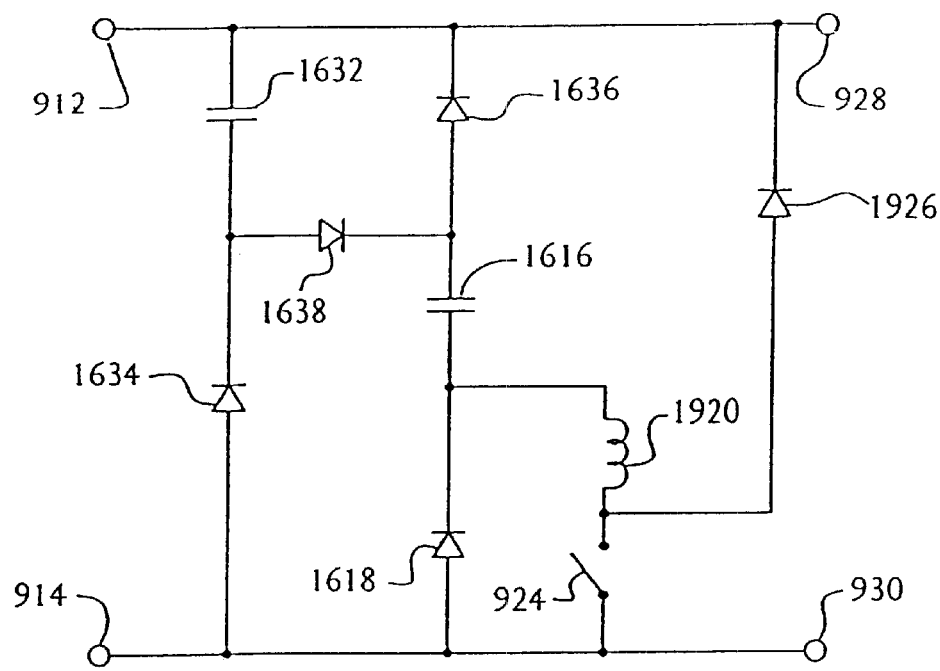
FIG. 15 is a simplified schematic circuit diagram of a seventh embodiment of a valley fill circuit in accordance with the present invention.

Resistive losses in the valley fill circuit 1710 of FIG. 13 may be reduced as shown in FIG. 15 by replacing resistor 1620 with an inductor 1920 in series with switch 924. In an alternative arrangement, the combination of the inductor 1920 and the switch 924 may be replaced by a single inductor. However, the high-frequency switching action of switch 924 permits a relatively small, and inexpensive, inductor 1920 to be used.

Figure 16:
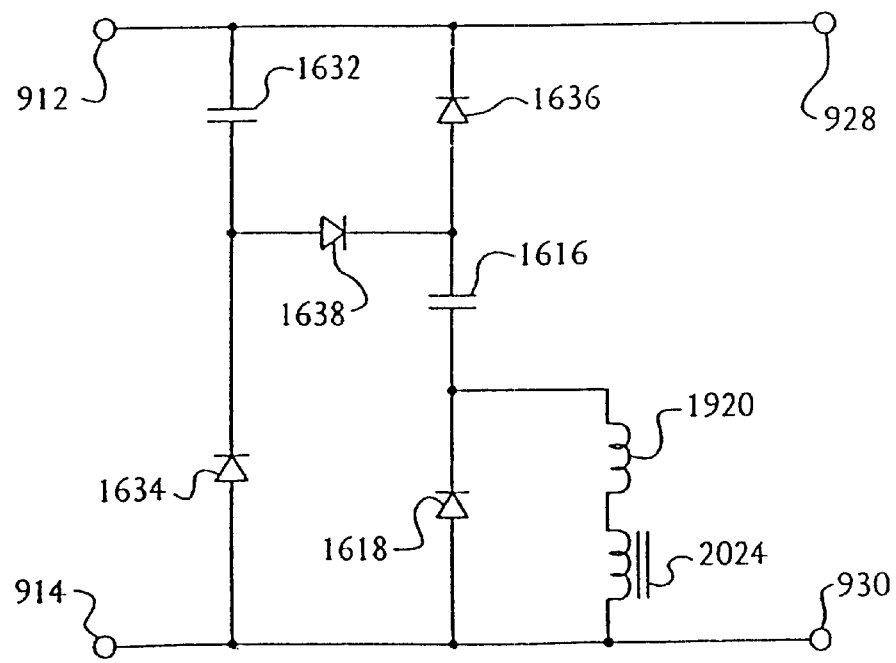
FIG. 16 is a simplified schematic circuit diagram of an eighth embodiment of a valley fill circuit in accordance with the present invention.

As an alternative to switch 924, a secondary winding 2024 from a high-frequency transformer may be substituted as shown in FIG. 16. High-frequency transformers are typically present in ballasts. By the addition of the proper number of turns of a secondary winding (preferably to an already existing transformer), a voltage of alternating polarity may be introduced in series with inductor 1920, alternately opposing and aiding the flow of current through the inductor 1920. The winding 2024 thereby effectively functions as a switch.

The Inverter Circuit

Figure 17:
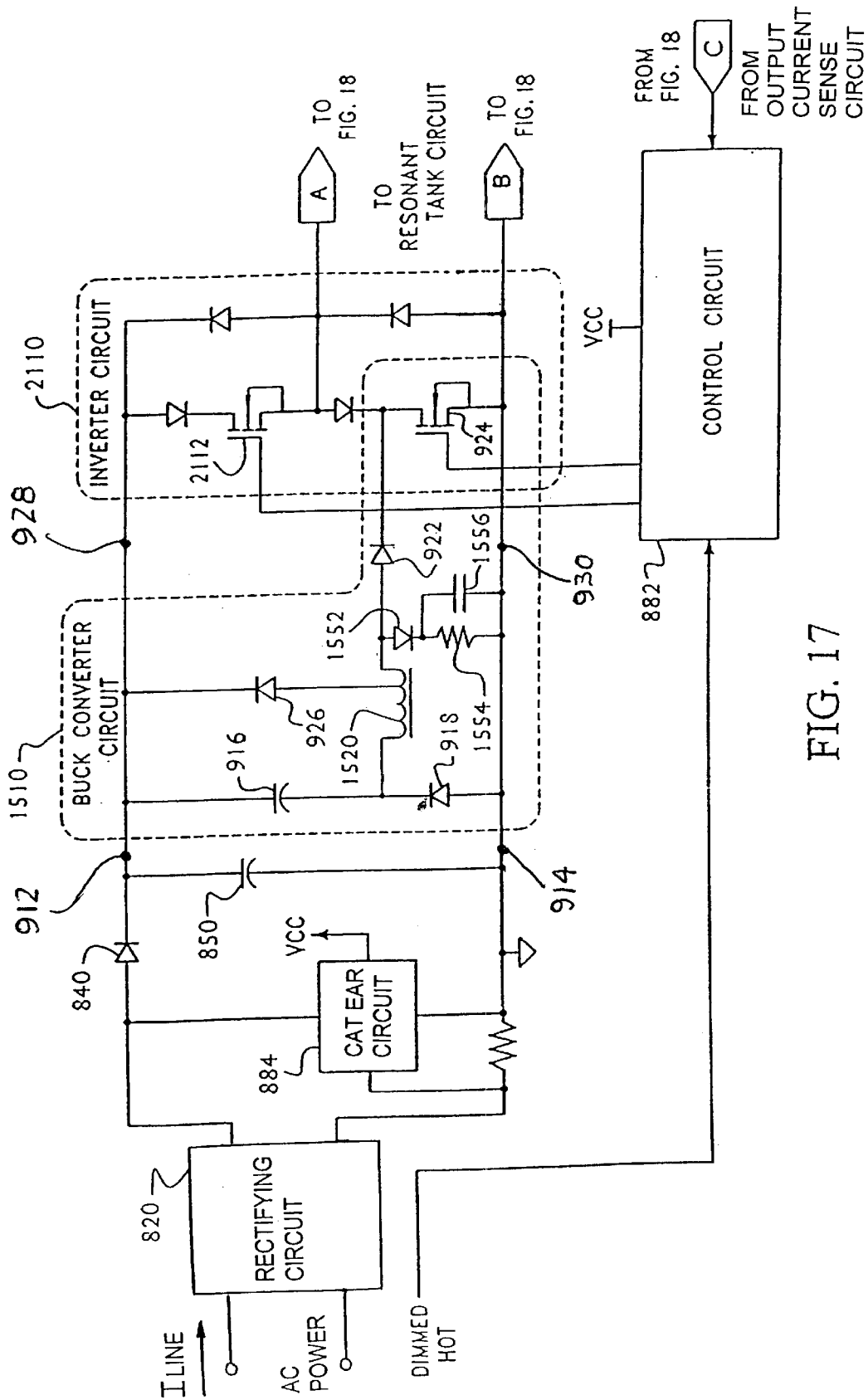
FIGS. 17 and 18 are simplified schematic circuit diagrams of a ballast constructed in accordance with the invention.
Figure 18:
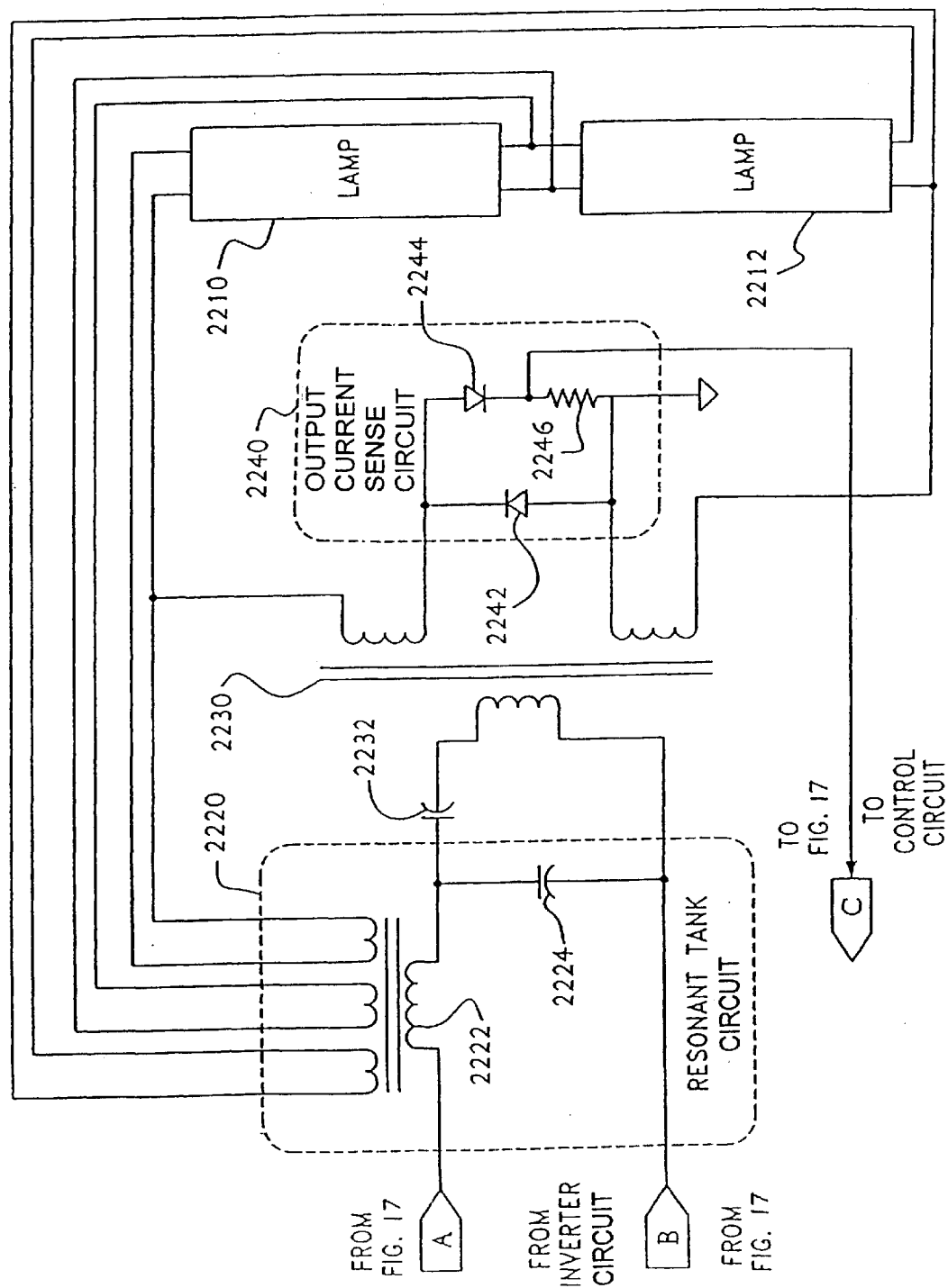

As can be seen in FIGS. 17 and 18, connected to the output of the capacitor 916 and the buck converter 1510 is a high-frequency inverter circuit 2110 for providing a high-frequency voltage to a resonant tank circuit 2220 of FIG. 18, for driving a lamp current through a gas discharge lamp. The inverter circuit 2110 includes series-connected first and second controllably conductive devices 2112, 924. The bus voltage is the greater of either the rectified line voltage, or the voltage across the capacitor 916. When the rectified line voltage is greater than the voltage on the capacitor 916, then the inverter circuit 2110 draws current directly from the AC line. When the rectified line voltage is less than the voltage on capacitor 916, then the inverter circuit 2110 draws current from the capacitor 916.

When the inverter circuit draws current directly from the AC line for greater than 90° of each 180° line frequency half cycle around the time of the peak of the AC line, the resulting THD of the ballast input current has been found to be less than 33.3%.

The operation of the inverter circuit 2110 will now be described in connection with FIG. 19. The inverter circuit 2110 uses a fixed frequency, D(1-D) complementary duty cycle switching mode of operation. This means that one, and only one, of the switching devices 2112, 924 is conducting at all times. In this discussion, the duty cycle D refers to the conduction time of the first switch 2112, and the complementary duty cycle (1-D) refers to the conduction time of the second switch 924. Considering that one of the devices 2112, 924 is conducting at all times, the sum of the conduction times referred to as D and (1-D) of each respective device is the period of the switching frequency. In practical electronic circuits there is usually a time when neither device 2112, 924 is conducting, commonly referred to as dead time. This dead time is normally very short with respect to the conduction times of device 2112, 924. The purpose of this dead time is to ensure that both devices 2112, 924 do not conduct simultaneously. However, this dead time may be increased and used as an additional control parameter of the inverter circuit. When switch 2112 (referred to as SW 1 in FIG. 19) is conducting, then the output of the inverter circuit 2110 is connected to the buck converter circuit output terminal 928 which is the valley filled voltage. When the switching device 924 (referred to as SW2 in FIG. 19) is conducting, then the output of the inverter circuit 2110 is connected to the buck converter circuit output terminal 930, which is circuit common. For a given instantaneous valley filled voltage, the maximum lamp current that could be delivered to the gas discharge lamp for that instantaneous valley filled voltage is achieved when the conduction times of the two switching devices 2112, 924 are equal. In this electronic ballast the lamp current depends on both the instantaneous valley filled voltage and the conduction times of the switching devices 2112, 924. The conduction times of the switching devices 2112, 924 are controlled by a control circuit 882 shown in FIG. 17 in response to the current flowing through the gas discharge lamps 2210, 2212 shown in FIG. 18. The operation of the control circuit is described in detail below.

Conventional control algorithms used for controlling electronic ballast inverters typically adjust the conduction time of the controllably conductive devices so as to maintain rms lamp current at a constant value. Conventional control loops are slow in response so as to keep the conduction times of the controllably conductive devices nearly constant over the course of a line frequency half cycle. This algorithm, when applied to a valley fill type ballast, would result in a high current crest factor of the lamp current due to the modulation of the valley filled voltage.

The control circuit of the presently preferred embodiment adjusts the conduction times of the controllably conductive devices. The conduction time of switch 2112 is reduced so as to produce relatively narrow pulses and the conduction time of switch 924 is increased so as to produce relatively wide pulses. This reduces the peak of the envelope of the high frequency lamp current near the peak of the line frequency half cycle. This is subsequently referred to as "hump down" of the lamp current (FIG. 19).

Reducing the lamp current near the peak of the line frequency half cycle reduces the current drawn by the inverter circuit. This effect, on its own, would thereby lower the ballast input current and raise the ballast input current total harmonic distortion. However, in the ballast of this invention, the decrease in lamp current is associated with the increase in conduction time of switch 924. This increase in conduction time causes an increase in the charging current of the valley fill capacitor. This increase in valley fill current increases the total current drawn by the ballast near the peak of the line frequency half cycle. The increase in ballast current near the peak of the line frequency half cycle has the advantageous effect of reducing the ballast input current total harmonic distortion. This improvement counters the effect of increased THD caused by lowering the peak lamp current. The increase in ballast input current near the peak of the line frequency half cycle due to the increase in current drawn by the valley fill circuit is subsequently referred to as "hump up" of the ballast input current. See FIG. 19.

Although it has been described that the conduction time of switch 2112 is reduced so as to produce relatively narrow pulses and the conduction time of switch 924 is increased so as to produce relatively wide pulses, one skilled in the art could reverse the conduction times of switch 2112 and switch 924 with appropriate circuit rearrangement of the valley fill circuit so as to achieve the same hump up of ballast input current and hump down of the lamp current.

The Resonant Tank Circuit

Referring again to FIGS. 17, 18, the output of the inverter circuit 2110 is connected to a resonant tank circuit 2220 comprising an inductor 2222 and a capacitor 2224 (FIG. 18). The resonant tank circuit 2220 filters the inverter circuit 2110 output voltage to supply essentially sinusoidal current to the gas discharge lamps 2210, 2212. In addition, the resonant tank circuit 2220 provides voltage gain and increased output impedance. The output of the resonant tank circuit 2220 is coupled to the electrodes of the gas discharge lamps 2210, 2212 by means of a transformer 2230. A DC blocking capacitor 2232 prevents DC current from flowing through the primary windings of the transformer 2230.

The Current Sense Circuit

Referring to FIG. 18, the ballast also includes a current sense circuit 2240 comprising first and second diodes 2242 and 2244, and resistor 2246, coupled in series with the lamps 2210, 2212. The current sense circuit 2240 generates a half-wave rectified voltage across resistor 2246 that is proportional to lamp current and represents a measure of actual light output of the gas discharge lamp. The half-wave rectified voltage is supplied as an input to the control circuit 882 of FIG. 17. In an alternative embodiment, the current sensing may be performed in a well-known manner by using a current transformer, or alternatively, full-wave connected diodes. For non-dimming ballasts, and dimming ballasts where only modest performance is required, the current sense circuit may be omitted.

The Control Circuit

Figure 20:
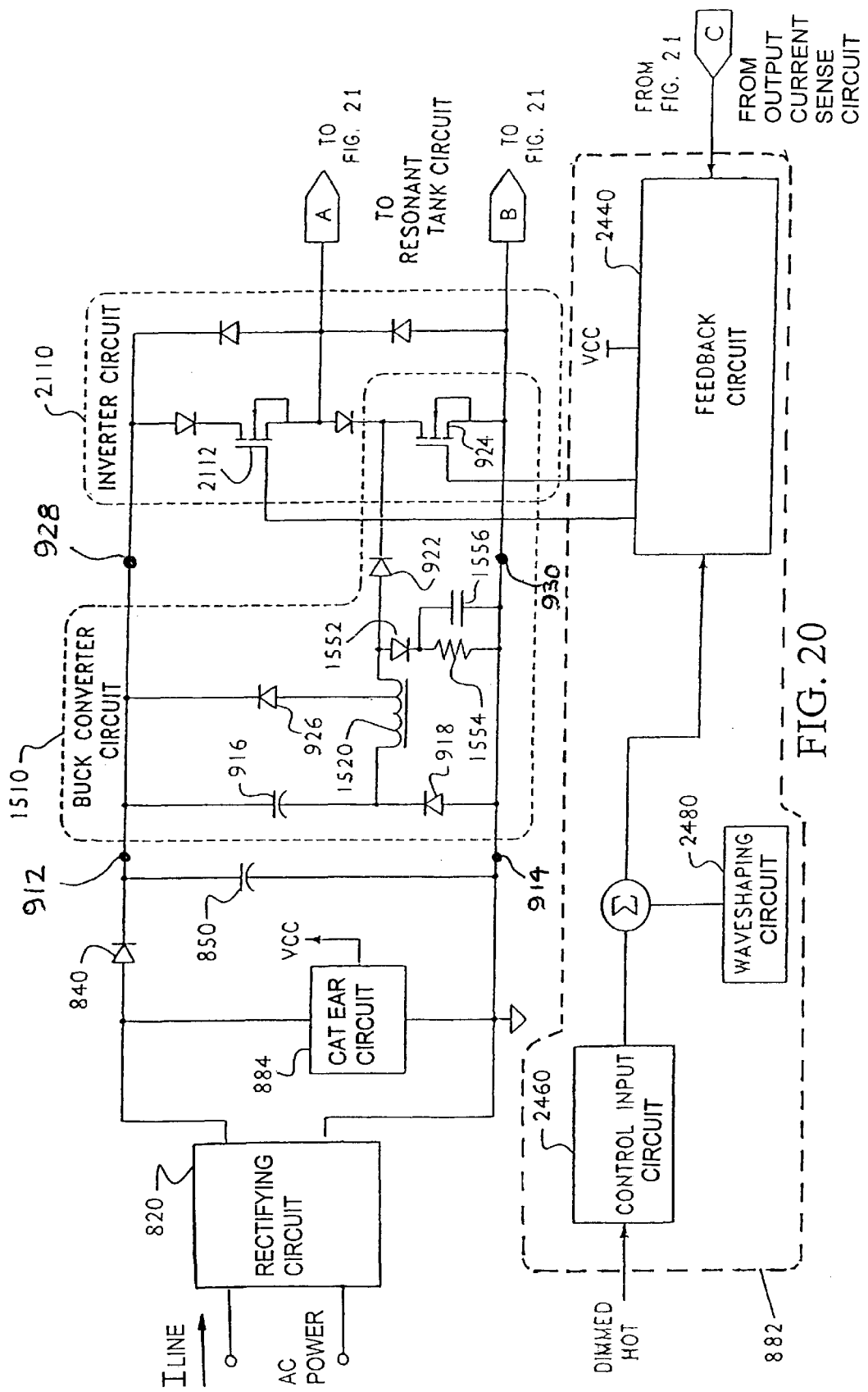
FIGS. 20 and 21 are simplified schematic circuit diagrams of a second embodiment of an electronic ballast constructed in accordance with the invention.
Figure 21:
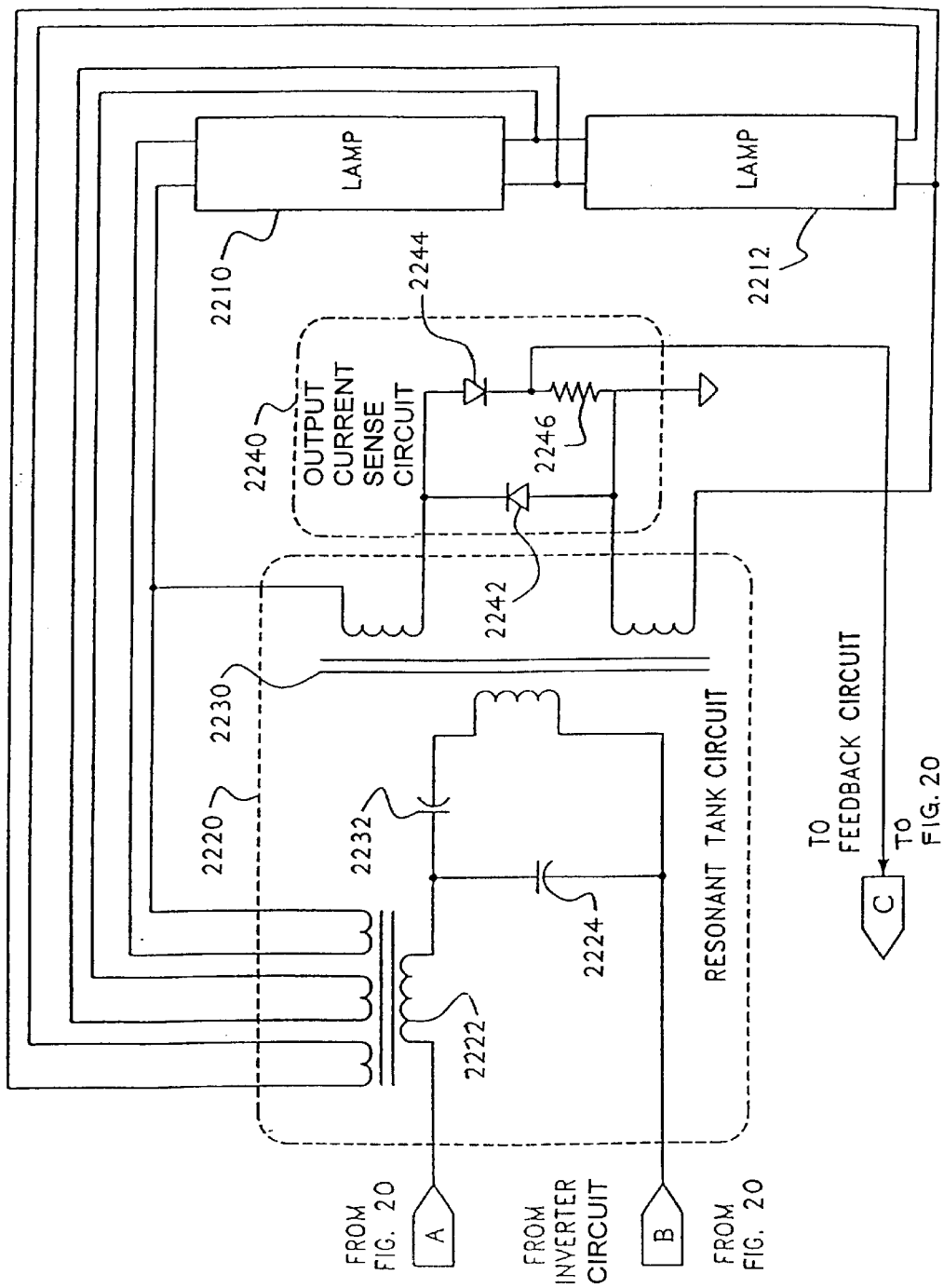
Figure 22:
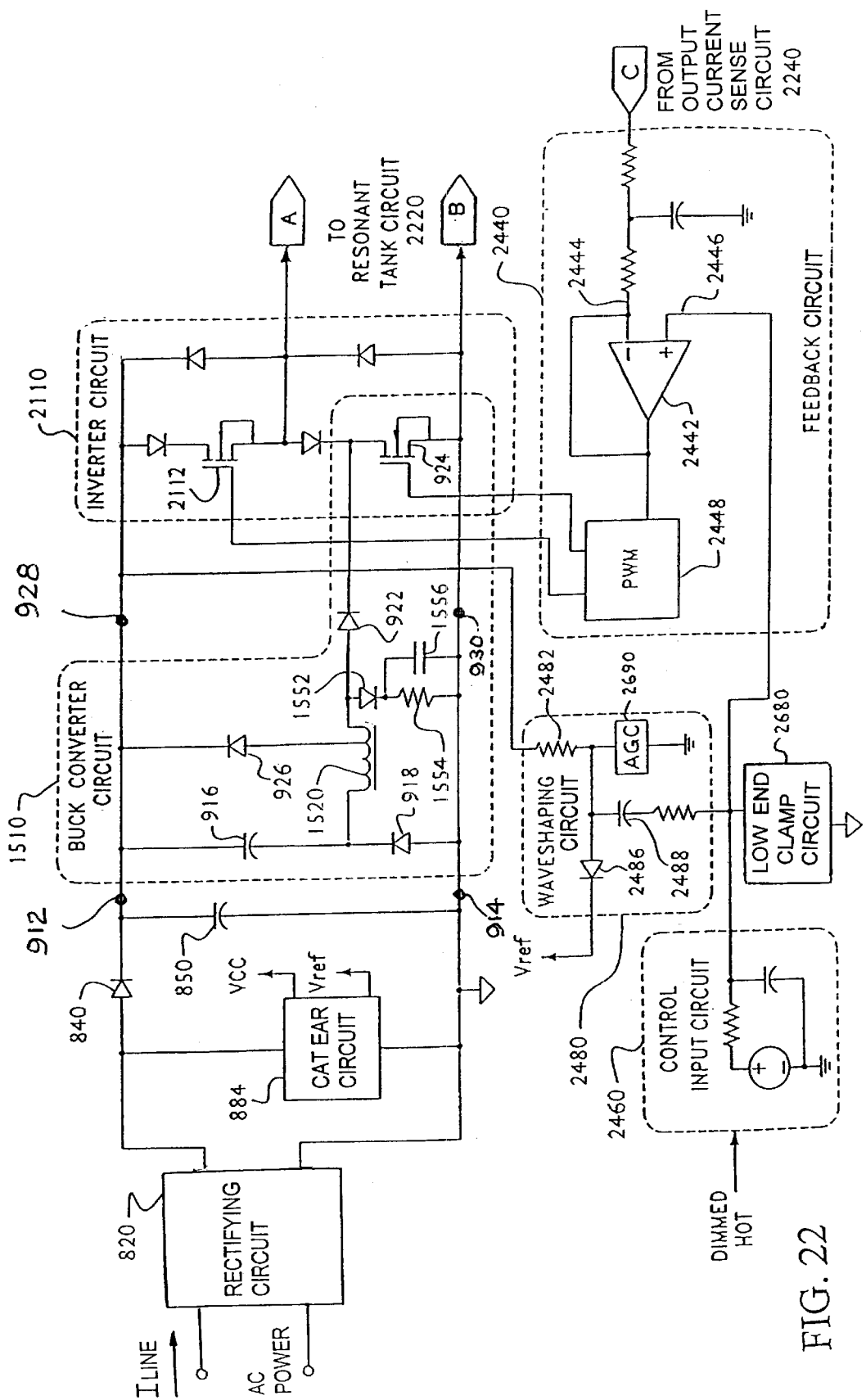
FIG. 22 is a simplified partial schematic circuit diagram of the ballast of FIGS. 20 and 21 which includes details of the control, wave shaping, and feedback circuits.

The control circuit of 882 of FIG. 17 will be described in more detail with reference to FIGS. 20, 21, and 22. A first embodiment of the control circuit 882 generates signals to control the conduction of the switching devices 2112 and 924 (FIGS. 20 and 22). The control circuit 882 receives as an input the half-wave rectified voltage from the current sense circuit 2240 and generates a DC voltage that represents actual light output from the lamps. This DC voltage, representative of light output, is compared to a reference voltage, indicative of a desired light level, to adjust the duty cycles of the switching devices 2112, 924 so as to minimize the difference between the voltage that represents the light output voltage and the reference voltage. In a dimming electronic ballast, the reference voltage may be provided by an external input such as a 0-to-10 Volt control signal. Alternatively, the reference voltage may be generated by detecting a phase angle control signal applied to the ballast by means of the AC line voltage when the ballast is supplied through a 2 wire dimming control. In the preferred embodiment of the ballast, the reference voltage is generated from a phase angle control signal applied to the ballast via an additional input to the ballast, such as is depicted in FIGS. 17, 20, 22 by the "Dimmed Hot" input.

The control circuit includes a feedback circuit 2440 (FIG. 20) connected to receive inputs from the current sense circuit 2240 and a control input circuit 2460, and supplies conduction signals to the control terminals of the controllably conductive devices 2112, 924. The control circuit may optionally include a wave shaping circuit 2480 to provide an additional input to the feedback circuit 2440, as will be described in detail below.

As can be seen in FIG. 22, the feedback circuit 2440 includes a differential amplifier 2442 connected to receive at its inverting terminal 2444 the input signal representative of lamp light output from the current sense circuit 2240, and to receive at its non-inverting terminal 2446 the desired light level reference signal. The differential amplifier 2442 produces an error signal representative of the difference between the actual light output the desired light output. The error signal is in turn provided to a pulse-width modulation (PWM) circuit 2448 that generates the drive signals that are applied to the gates of the inverter circuit switches 2112, 924. The PWM circuit 2448 is well-known in the art and hence will not be described in detail here.

Figure 23:
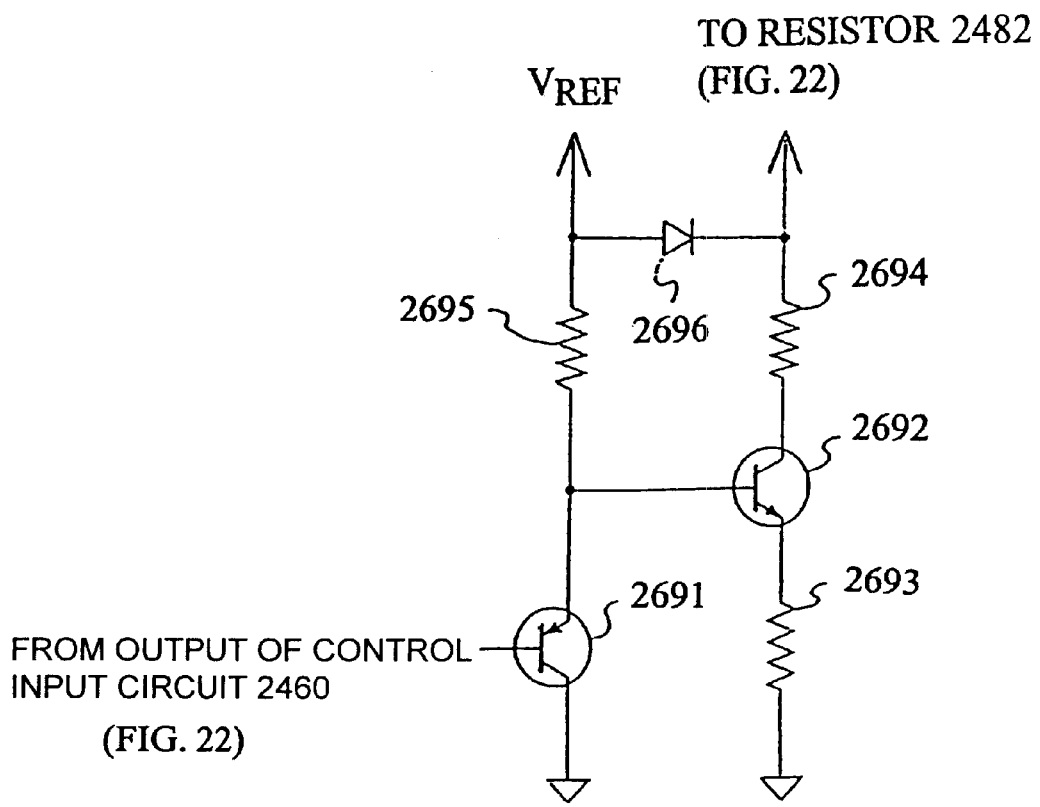
FIG. 23 is a simplified schematic circuit diagram of an automatic gain control circuit for the wave shaping circuit of FIG. 22.

The wave shaping circuit 2480 provides an AC reference voltage signal that is summed with the essentially DC reference voltage signal from the control input circuit 2460. While the shape of the AC reference voltage signal can be made to take on a variety of waveshapes, a particularly effective, yet simple, circuit can be designed that takes advantage of the waveforms already present in the ballast. The wave shaping circuit 2480, shown in detail in FIG. 22, includes a voltage divider including a resistor 2482 connected in series with an automatic gain control (AGC) circuit 2690 that provides a scaled version of the valley filled voltage from the buck converter circuit 1510. Details of the AGC 2690 are shown in FIG. 23 and discussed below. If it is not necessary to adjust the gain of the wave shaping circuit 2480, such as in non-dimming ballasts, then the AGC 2690 may optionally be replaced by a passive impedance such as a resistor.

The scaled voltage signal from the divider is clipped by means of a diode 2486 having its anode connected to the output of the divider and its cathode connected to a DC reference voltage VREF. The clipped signal is then passed through a DC blocking capacitor 2488 to be summed with the DC reference voltage from the control input circuit 2460.

The control circuit also includes a low end clamp 2680 connected between the common tie point for the control input, wave shaping, and feedback circuitry, and circuit common. The low end clamp 2680 prevents the reference voltage from going so low that the current through the lamp cannot be sustained.

The addition of the AC reference signal has the effect of reducing the combined reference voltage when the valley filled voltage is lower, such as near the zero crossings of the input line voltage, and increasing the combined reference voltage as the valley filled voltage is increasing, such as when the input line voltage is approaching an instantaneous peak value. The lamp current supplied to the lamp by the inverter circuit 2110 will likewise be less when the valley filled voltage is lower, and increasing when the valley filled voltage is increasing. Thus, the addition of the AC reference signal, which tracks or follows the valley filled voltage, has the effect of shaping the current drawn by the lamp to be similar in shape to that of the valley filled voltage. Consequently the ballast input current has a shape which is lower near the valleys and higher near the peaks of the AC line voltage, thereby improving the ballast input current total harmonic distortion. However, this improvement in ballast input current total harmonic distortion comes at the expense of greater crest factor of the lamp current.

An additional feature of the wave shaping circuit 2480 is the diode 2486 for clipping the peaks of the AC reference signal. During the time when the AC reference voltage signal is clipped, the combined reference voltage remains constant while the valley filled voltage is peaking. The overall response of the control circuit is designed to be "fast", so the control circuit responds quickly during the peaks in the bus voltage so as to reduce the conduction time of switch 2112 and increase the conduction time of switch 924, so as to deliver a more constant high frequency voltage to the resonant tank, and thus, a constant lamp current, to the lamp. The net effect is to reduce the peaks of the lamp current envelope, and thus reduce current crest factor of the lamp current. This is shown in FIG. 19, as a hump down of the lamp current. At the same time, the increase in conduction time of switch 924 increases the charging current drawn by the capacitor 916, as shown in FIG. 19. This causes the ballast input current to increase over that which would have occurred without the increase in charging current of capacitor 916, and thus hump up the ballast input current. This effect reduces the ballast input current total harmonic distortion. Electronic dimming ballasts constructed with the wave shaping circuit as described have achieved stable operation with ballast input current total harmonic distortion below 20% and current crest factor of the lamp current below 1.7.

The AGC circuit 2690, shown in FIG. 22, changes the output of wave shaping circuit 2480 when the ballast is required to reduce the lamp current and thereby dim the lamp. The AGC circuit 2690 in FIG. 23 includes first and second transistors 2691 and 2692, resistors 2693, 2694, and 2695, and diode 2696. The conduction of the first transistor 2691 is controlled by the output of the control input 2460 (FIG. 22). When the input voltage goes low, indicating a dimming condition, conduction of the first transistor 2691 increases, lowering the voltage at the base of the second transistor 2692, thereby causing the second transistor 2692 to become less conductive, effectively increasing the impedance of the AGC circuit 2690 presented to the wave shaping circuit 2480. The increase of impedance of the AGC circuit 2690 increases the voltage at the junction of the AGC circuit 2690 and resistor 2482 resulting in more of the signal being clipped by diode 2486. As this voltage rises and gets increasingly clipped, the AC portion of this voltage is reduced, thereby reducing the effect of the wave shaping circuit.

Figure 24:
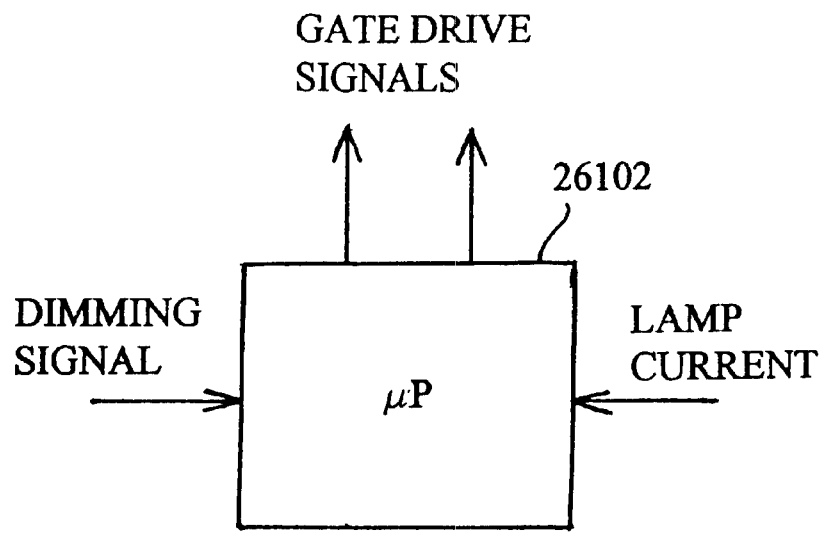
FIG. 24 is a simplified block diagram of a second embodiment of the feedback circuit of FIG. 20.

A second embodiment of the feedback circuit 2440 of FIG. 20 is shown in FIG. 24 and includes a microprocessor 26102 coupled to receive inputs representative of the desired light level and the lamp current, and produce output signals for driving the control terminals of the controllably conductive devices of the inverter circuit. One such microprocessor suitable for this use is manufactured by Motorola Corporation under the model number MC68HC08. For simplicity, analog-to-digital and digital-to-analog circuits necessary for interfacing the microprocessor 26102 with the analog circuitry of the ballast are considered to be within the ordinary skill of the art and are not shown here.

Figure 25:
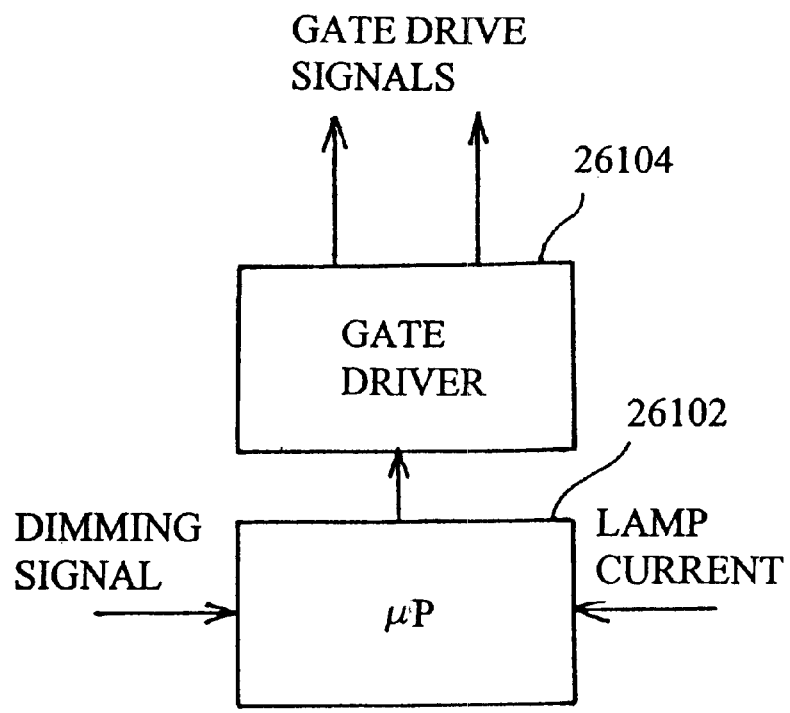
FIG. 25 is a simplified block diagram of a third embodiment of the feedback circuit of FIG. 20.

A third embodiment of the feedback circuit 2440 of FIG. 20 is shown in FIG. 25 and includes, in addition to the microprocessor 26102, a gate driver circuit 26104 that receives a single gate drive signal from the microprocessor 26102 and produces signals capable of controlling the operation of the inverter circuit switches. One such gate driver circuit suitable for this use is manufactured by International Rectifier under the part number IR2111. Of course, other suitable microprocessors (such as a PIC 16C54A from Microchip Technology Inc. of Chandler, Ariz.) and gate drivers may be substituted for the specific embodiments mentioned here. In addition, an application specific integrated circuit (ASIC) (not shown) or a digital signal processor (DSP) (not shown) may be substituted to provide the same functionality as the microprocessor disclosed herein.

Figure 26:
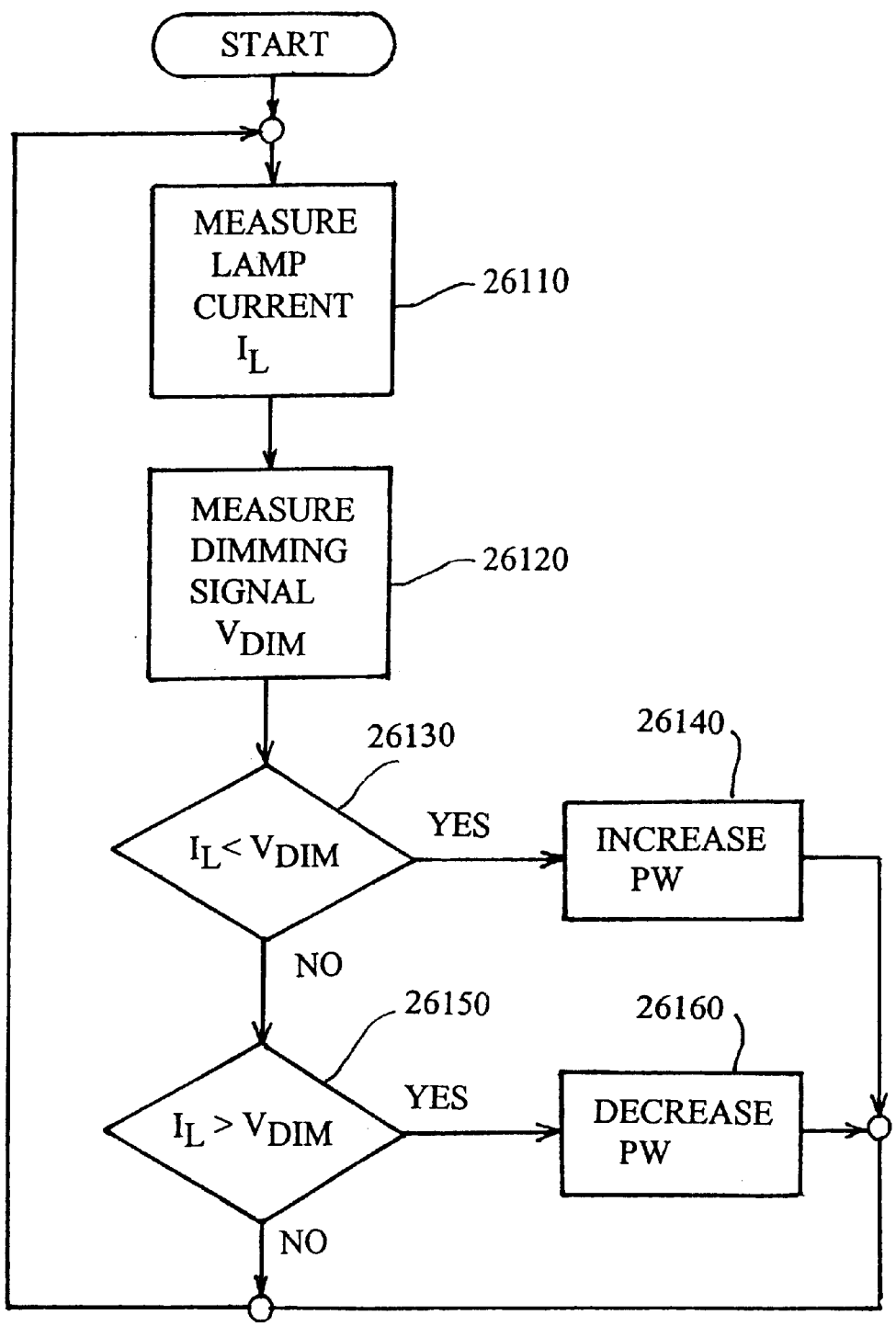
FIG. 26 is a simplified flowchart illustrating the operation of the feedback circuits of FIGS. 24 and 25.

A high-level flowchart illustrating the operation of the feedback control circuit embodiment of FIGS. 24 and 25, shown in FIG. 26, includes the steps of measuring the lamp current IL (step 26110), and measuring the dimming signal VDIM representative of the desired light level (step 26120). The measured lamp current IL is compared to the measured dimming signal VDIM (step 26130) and, if IL is less than VDIM, then the conduction times of the controllably conductive devices of the inverter circuit are driven to be more equal (step 26140). If IL is greater than VDIM as determined in step 26150, then the conduction times of the controllably conductive devices of the inverter circuit are driven to be more unequal (step 26160). If IL is equal to VDIM, then the conduction times of the controllably conductive devices of the inverter circuit remain unchanged and the process repeats.

The Cat Ear Circuit

Figure 27:
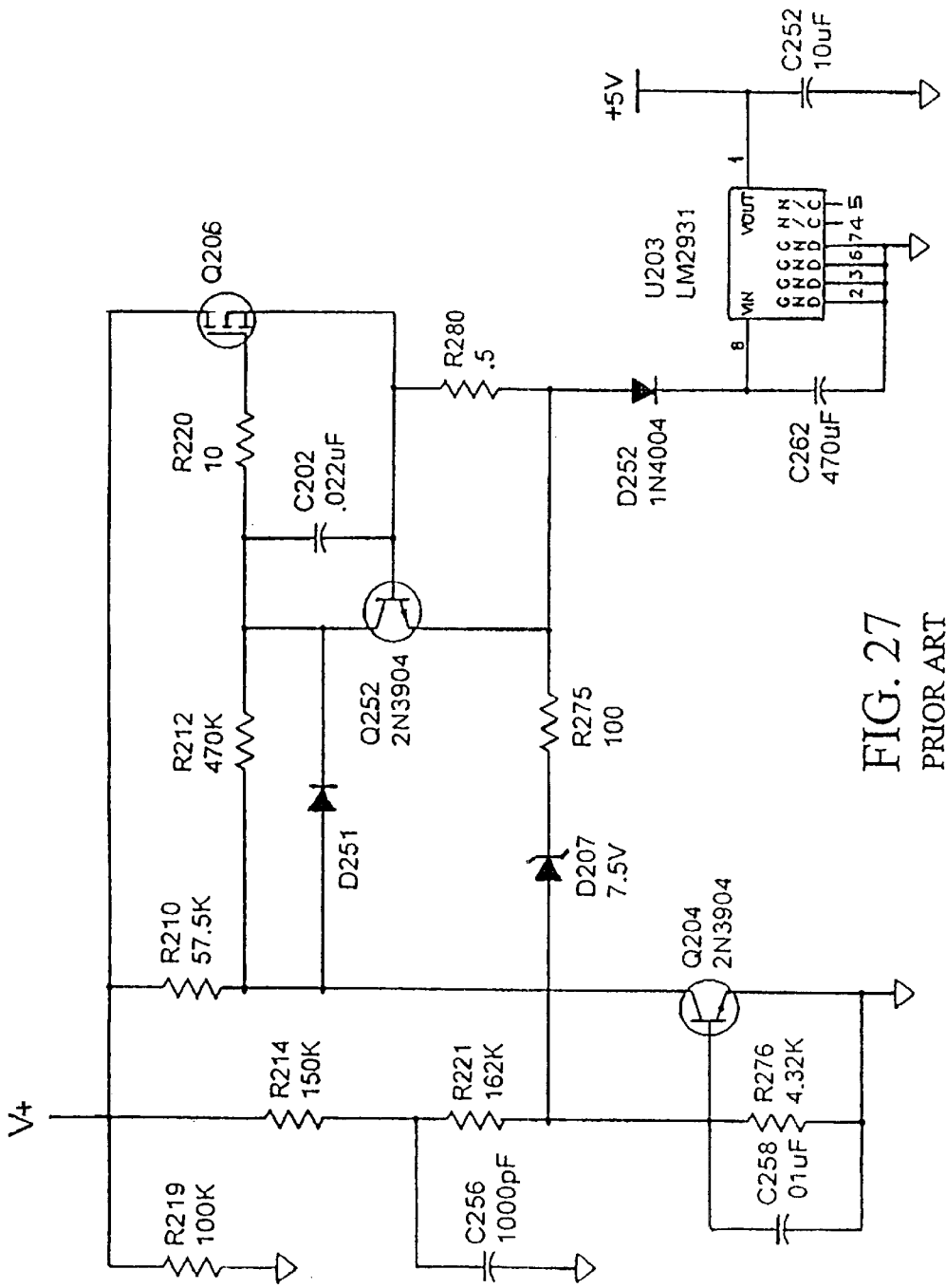
FIG. 27 is a simplified schematic circuit diagram of a prior art cat ear power supply.

Cat ear circuits have been used for years to provide power for control circuits in two-wire, triac based dimmers for incandescent lamps and fan motors. A typical prior art cat ear circuit is shown in FIG. 27. Standard electronic dimmers for lighting loads are well known and circuits using the cat ear power supply circuit are also well known. In such applications, the dimmer is located between the AC line and the load, receiving as an input sinusoidal voltage from the AC line and providing as an output a "truncated" form of the sinusoidal input voltage in which the leading edge of the input voltage waveform is blocked by the non-conducting triac, and only the trailing portion of the input voltage waveform is passed on to the load by the triac, when the triac is conducting. The triac is turned on at a predetermined time and conducts until the next zero crossing of the input voltage waveform. By varying the time until conduction of the triac, with respect to the zero crossing of the AC line voltage, the amount of power delivered to the load may be controlled.

The prior art cat ear circuit of a 2 wire dimmer draws power from the AC line during a portion of the input voltage waveform when the triac is not conducting. In other words, the prior art cat ear circuit draws current from the line, through the load, during the time that no significant load current would normally flow. However, until now, cat ear circuits have only been used to derive an auxiliary power supply to operate control circuits within an electronic device. They have not been used for the purpose of deliberately shaping the input current drawn from the line by an electronic device. Specifically, cat ear circuits, until now, have not been used in electronic ballasts to assist in the shaping of input current nor have they been used as an auxiliary power supply in an electronic ballast. In the ballast of the invention the input current shaping benefits of the cat ear circuit contribute to the reduction of ballast input current total harmonic distortion.

The ballast of the invention includes a cat ear circuit 884 (FIG. 20) connected across the outputs of the rectifying circuit 820. The cat ear circuit may be generally defined as a circuit that is designed to draw current from the line during selected portions of the line cycle. The cat ear circuit may thus be used in a novel and unique manner for shaping the ballast input current waveform so as to improve ballast input current total harmonic distortion. Indeed, the cat ear circuit may be used for shaping the input current waveform of a variety of electronic devices, such as switch-mode power supplies and AC line-to-DC converters and for reducing input current total harmonic distortion.

Figure 28:
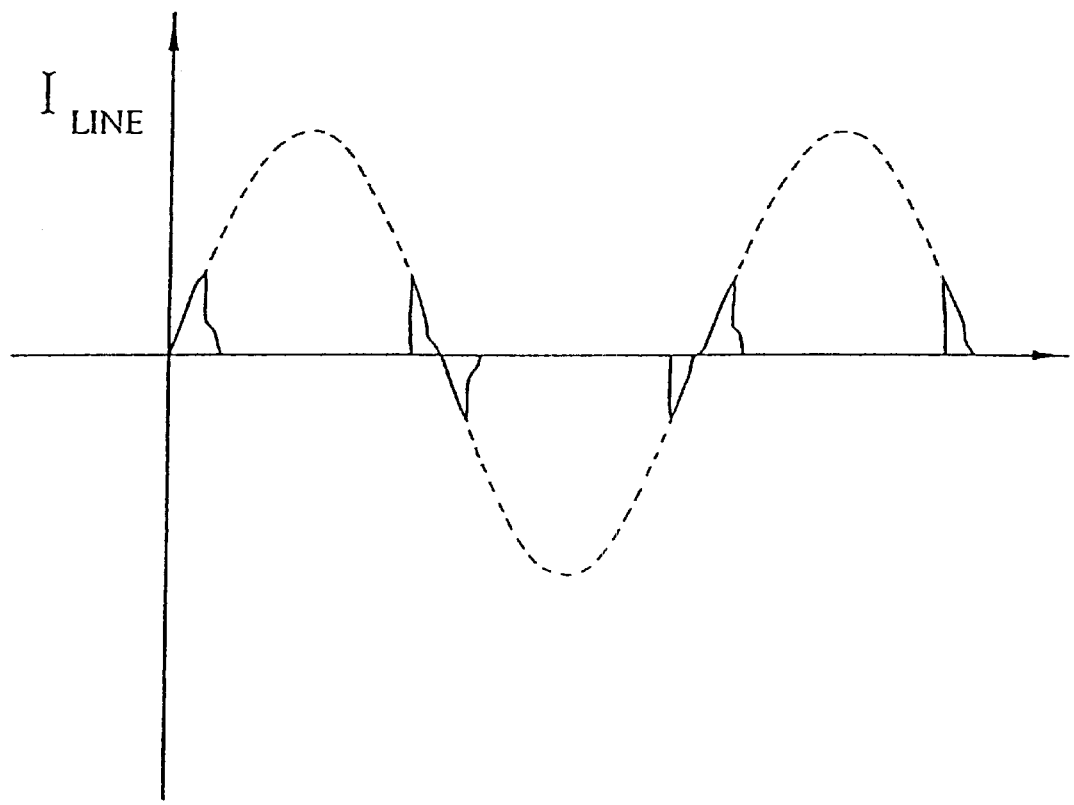
FIG. 28 shows a simplified waveform of the line current drawn by the cat ear power supply of FIGS. 20 and 22.

The cat ear circuit 884 (FIG. 20) draws current from the rectifier 820 only at the "tails" of the input line cycle, that is, the regions of the input line cycle near the line voltage zero crossings, as shown in FIG. 28. The cat ear circuit 884 draws current near line voltage zero cross and thereby "fills in" the tails of the input line current drawn from the AC line when the back end of the ballast is not drawing current from the AC line (FIG. 19). By filling in the tails, the line current drawn by the ballast is made more continuous, thereby reducing ballast input current total harmonic distortion, as will be described in connection with FIG. 31.

Figure 31:
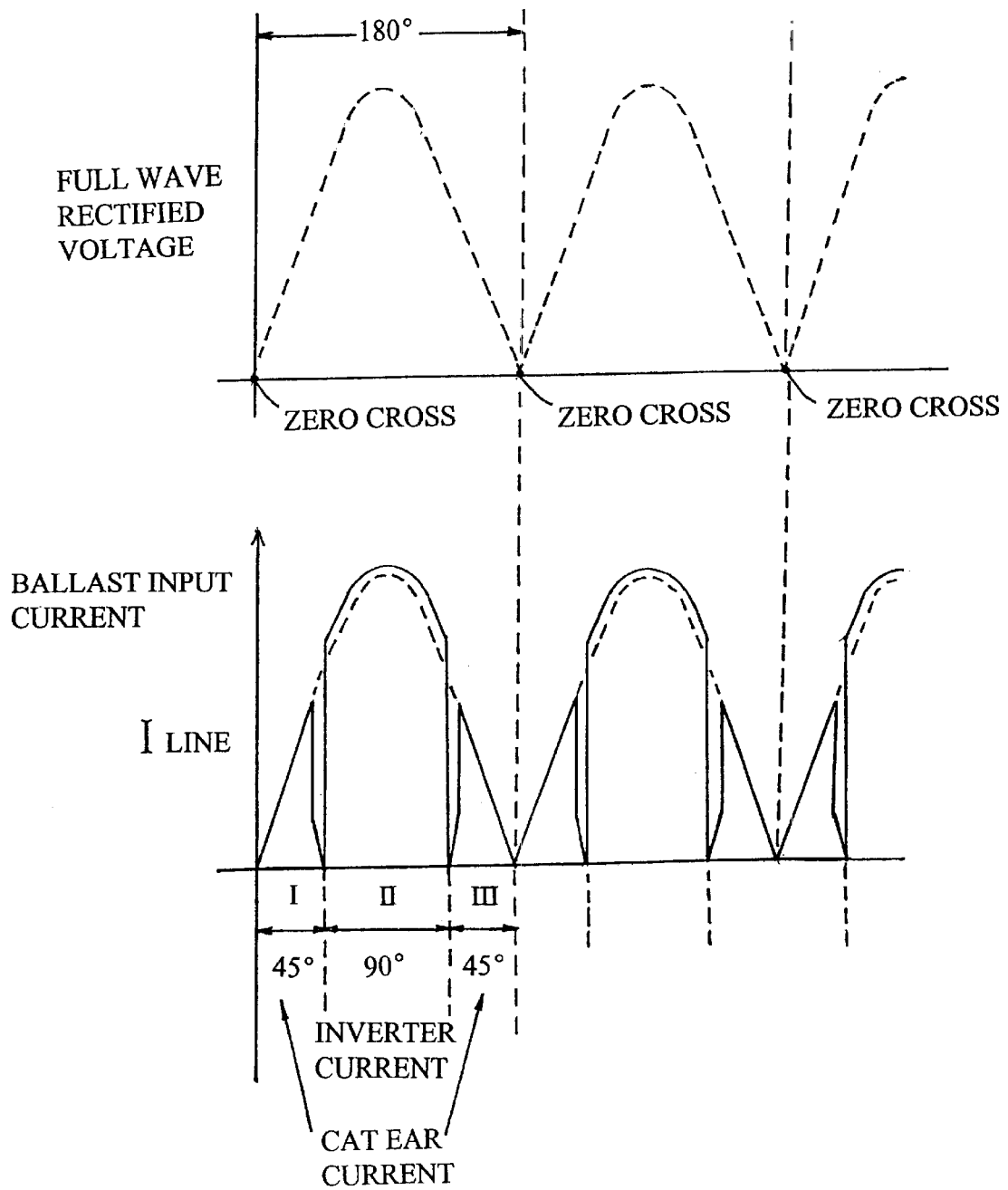
FIG. 31 shows a simplified waveform of the line current drawn by the electronic ballast of FIGS. 20 and 21.

The cat ear circuit draws ballast input current for a relatively short time at the tails of each 180 degree line frequency half cycle as shown in FIG. 31. In one embodiment, the cat ear circuit draws ballast input current for about 45 degrees of each 180 degree line frequency half cycle following a zero crossing (interval I in FIG. 31). Then, the inverter circuit draws ballast input current for about 90 degrees of each 180 degree line frequency half cycle (interval II in FIG. 31). Finally, the cat ear circuit draws ballast input current for about 45 degrees of each 180 degree line frequency half cycle before a subsequent zero crossing (interval III in FIG. 31).

This embodiment shows the cat ear circuit drawing ballast input current for about 45 degrees after the zero crossing and about 45 degrees before the subsequent zero crossing. However, one skilled in the art can see that the time may be varied where the cat ear circuit draws ballast input current. For example: the cat ear circuit draws ballast input current for about 35 degrees of each 180 degree line frequency half cycle following the zero crossing, then the inverter circuit draws ballast input current for about 90 degrees of each 180 degree line frequency half cycle, and finally the cat ear circuit draws ballast input current for about 55 degrees of each 180 degree line frequency half cycle before the subsequent zero crossing, without exceeding the desired maximum THD and without departing from the scope or spirit of the invention. Also, one skilled in the art can see that some dead time where no ballast input current is drawn by either the cat ear circuit or the inverter circuit may occur without exceeding the desired maximum THD and without departing from the scope or spirit of the invention.

Figure 29:
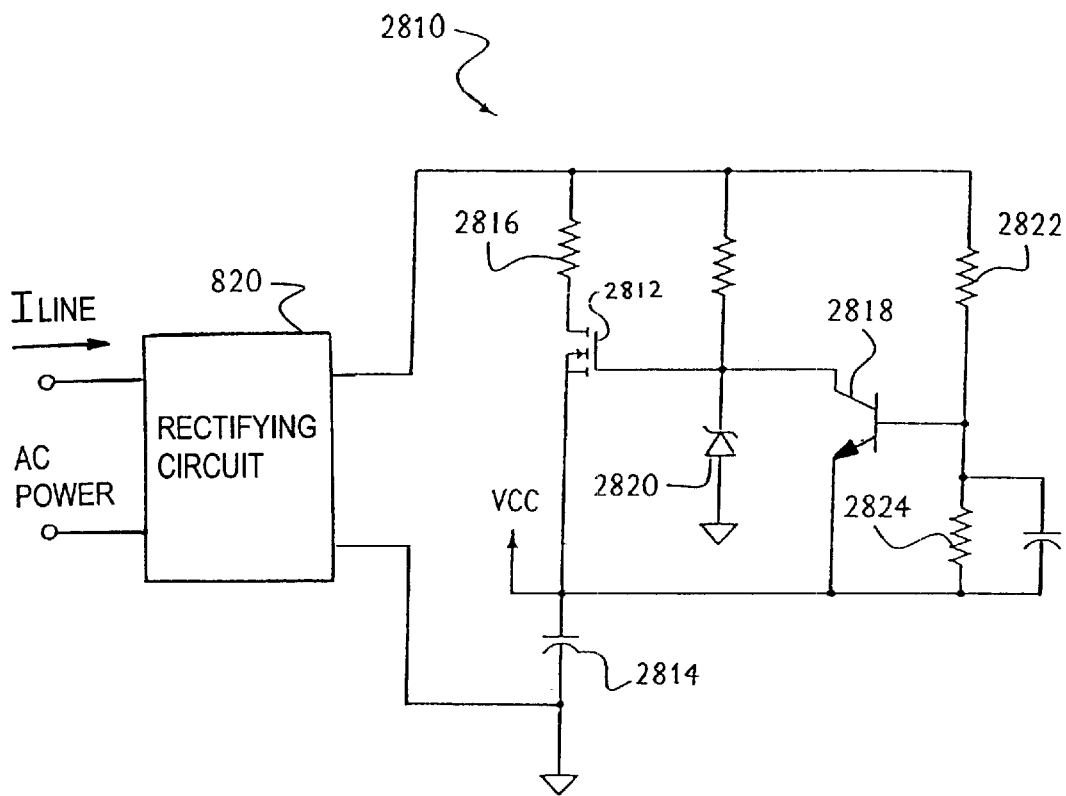
FIG. 29 is a simplified schematic circuit diagram of a first embodiment of a cat ear circuit having fixed cut-in and cut-out points in accordance with the invention.

In a first embodiment 2810 of the cat ear circuit 884, shown in FIG. 29, the cat ear circuit 2810 is designed with fixed voltage cut-in and cut-out points. That is, the first embodiment 2810 of the cat ear circuit will only draw current from the AC line when the rectified line voltage is below a fixed value. This condition will occur for a period of time near the line voltage zero crossing. The cut-out and cut-in voltage points can be adjusted so that the cat ear circuit 2810 draws current during a first interval from a time just after the line voltage zero crossing to a time when the inverter circuit 2110 of FIG. 22 is drawing current from the AC line, and during a second interval from a time when the inverter circuit 2110 stops drawing current from the AC line until the next line voltage zero crossing.

When the rectified line voltage is lower than a selected voltage, a charging transistor 2812 (FIG. 29) conducts to allow charging of an energy storage capacitor 2814, which charges toward a voltage VCC. The rate of charge of the capacitor 2814 is determined by a resistor 2816 in series with the drain of the MOSFET transistor 2812. This current drawn by the cat ear circuit when combined with the current drawn by the back end circuit of the ballast combines to form substantially piece-wise continuous ballast input current. Although the transistor 2812 is shown as a MOSFET, it may be any suitable controllably conductive device, such as, without limitation, a BJT or an IGBT.

When the rectified line voltage is equal to or greater than the predetermined voltage, then cut-out transistor 2818 begins conducting. The collector of the cut-out transistor 2818 pulls the cathode of a Zener diode 2820 toward VCC, which effectively turns off the charging transistor 2812. The predetermined cut-in and cut-out voltages are determined by the resistive voltage divider network including resistors 2822 and 2824, to which the base of the cut-out transistor 2818 is connected.

It should be noted that the cat ear circuit of the invention also provides a power supply for the control circuit of the ballast. This enables the ballast to draw current during a predetermined portion of each half cycle of the AC line. This portion can include periods before and after line voltage zero crossings, or only one such period, or any other useful period during the line cycle.

Figure 30:
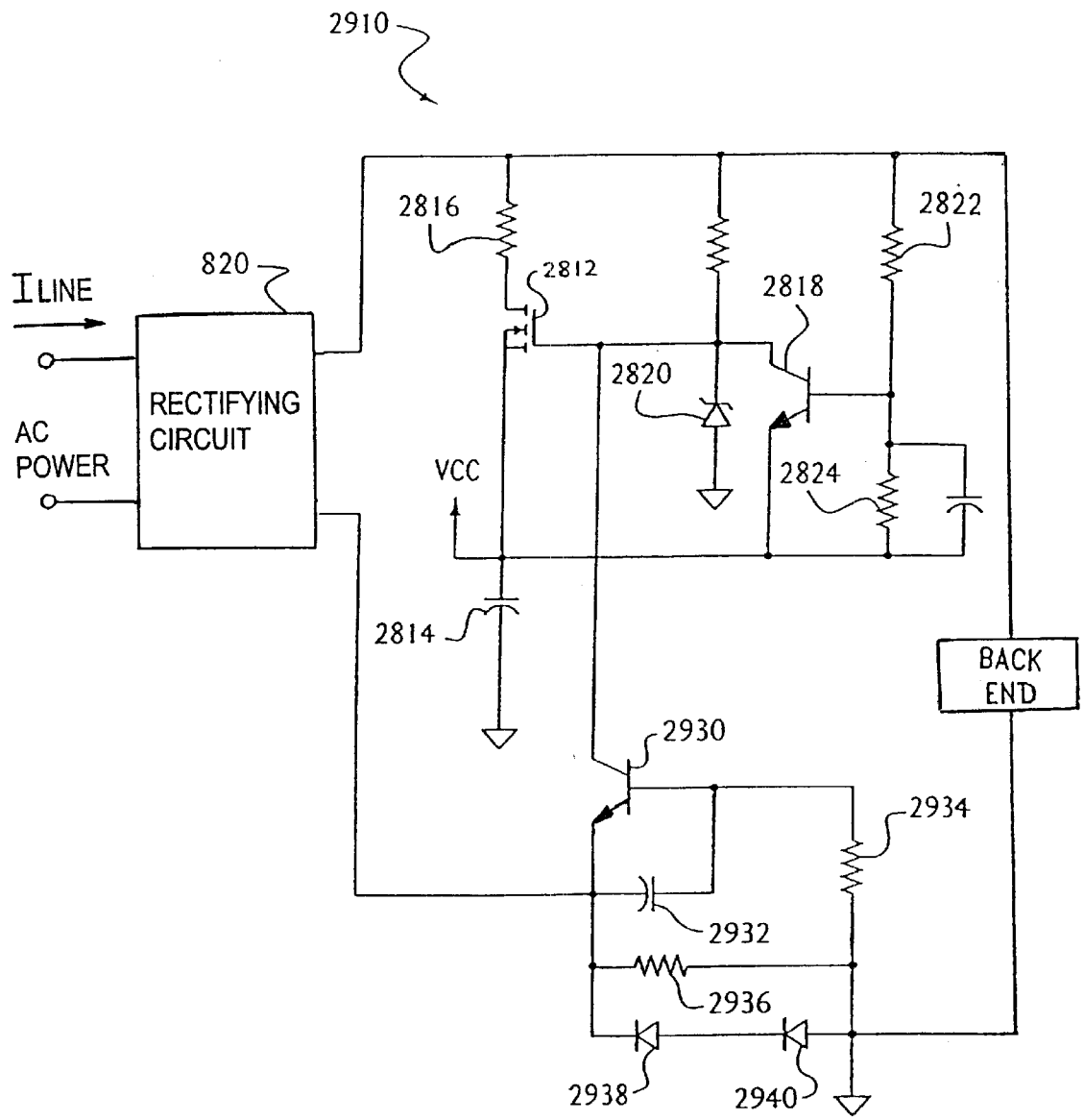
FIG. 30 is a simplified schematic circuit diagram of a second embodiment of a cat ear circuit including active monitoring of back end current.

In a second embodiment 2910 of the cat ear circuit 884, shown in FIG. 30, the cat ear circuit 2910 includes a circuit that actively monitors current drawn from the back end of the ballast and causes the cat ear circuit to only draw current from the line when the back end is not drawing current above a predetermined value. The current monitor circuit includes transistor 2930, capacitor 2932, resistors 2934, 2936, and diodes 2938, 2940. The ballast back end current flows through diodes 2938,2940 and resistor 2936 as it returns to the input rectifying circuit 820. When the ballast back end is drawing current above the predetermined value, the voltage at the emitter of transistor 2930 goes negative by a voltage equivalent to the combined forward voltage drops of diodes 2938, 2940. Through resistor 2934, the transistor 2930 base-emitter junction becomes forward biased, thereby turning transistor 2930 on. Turning transistor 2930 on pulls the gate of transistor 2812 low, thereby turning off transistor 2812. When back end current falls below the predetermined value set by the voltage divider of resistors 2936,2934 the, transistor 2930 turns off allowing transistor 2812 to turn on and provides a charging path for capacitor 2814. This second embodiment yields a slight improvement in ballast input current total harmonic distortion over the first embodiment.

The particular embodiments of the cat ear circuit that have been described show the cat ear circuit connected to the source of AC power through the rectifying circuit. Of course, it would be possible to build a cat ear circuit that connects directly to the source of AC power rather than through the rectifying circuit. For example, the particular embodiments of the cat ear circuit that have been described could alternately include a separate rectifier for connection to the source of AC power.

In addition to providing a means for shaping the input current drawn by the ballast so as to improve ballast input current total harmonic distortion, the cat ear circuit provides the following additional feature. The cat ear circuit also advantageously provides a faster start-up of the ballast and is not affected by the operating mode of the ballast in the same way that typical prior art trickle-charge and bootstrap systems are affected. Effectively the cat ear circuit and the inverter circuit are decoupled from each other allowing the fine tuning of each without affecting the other.

The result of combining the improved valley fill circuit, control circuits, and cat ear circuit of the present invention may be seen in FIG. 31. The cat ear circuit comprises means for drawing input current near the zero crossing of the input AC line voltage waveform so that the ballast input current total harmonic distortion is substantially reduced. In other words, the cat ear circuit fills in the current waveform near the zero crossings.

The improved valley fill circuit of the invention comprise means for charging an energy storage device over a substantial portion of each half-cycle of the AC input voltage so that the ballast input current total harmonic distortion is reduced. This is depicted in the idealized waveform in FIG. 31 wherein it may be seen that in the middle portion of each line half-cycle, the ideal waveform conforms substantially to a sinusoidal current waveform.

Figure 19:
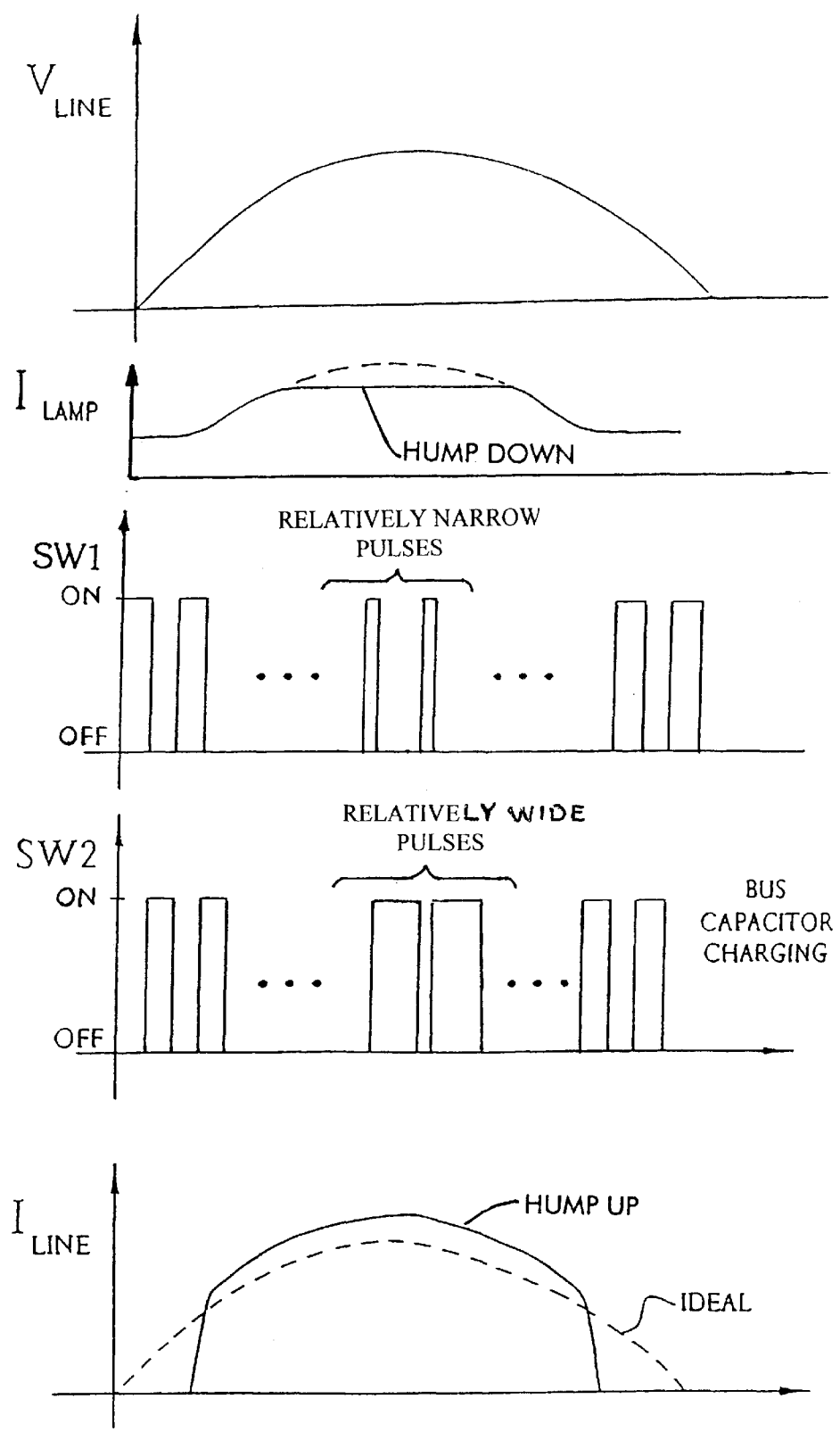
FIG. 19 is a set of diagrams on a common time base showing inverter circuit switch conduction times of FIG. 17 changing over a half-cycle of the line voltage, and the resultant line current drawn by the ballast.

The combination of the cat ear circuit and the improved valley fill circuit comprises means for selectively drawing current from the AC power source The operation of the ballast is further enhanced by the control circuit disclosed herein which comprises means for selectively varying the conduction times of the inverter circuit switches in response to the bus voltage so as to cause an energy storage device to draw more current from the AC power source around the time of the peak of each line half-cycle of the AC line voltage, and draw less current near the valleys of each line half-cycle of the AC line voltage as described in FIG. 19.

The provision of an independent power supply, that is, one that derives its power directly from the line at the front end of the ballast, either through the ballast's own rectifier stage, or through its own dedicated rectifier, rather than from the secondary of a transformer associated with the ballast back end or APFC, greatly simplifies the handling of transient conditions upon start up, shut down, and during abnormal or fault conditions. In the present case, the preferred form of such an independent power supply is the previously described cat ear circuit configured as a power supply. Thus, the independent power supply of the preferred embodiment allows for the decoupling of the power supply from the back end, thereby simplifying control of the ballast, while simultaneously providing a means to more precisely control the manner in which current is drawn from the line so as to reduce ballast input current total harmonic distortion.

Although the present invention has been described in relation to particular embodiments thereof many other variations and modifications and other uses will become apparent to those skilled in the art. It is preferred, therefore, that the present invention be limited not by the specific disclosure herein, but only by the appended claims.

What is claimed is:

1. An electronic ballast for driving at least one gas discharge lamp from a source of AC power which has a substantially sinusoidal line voltage at a given line frequency, comprising:
   a rectifying circuit having AC input terminals and DC output terminals; said AC input terminals connectable to the source of AC power; said rectifying circuit producing a rectified output voltage at its said DC output terminals when said AC input terminals are energized by said source of AC power;
   a valley fill circuit having input and output terminals; said input terminals of said valley fill circuit connected to said DC output terminals of said rectifying circuit; said valley fill circuit including an energy storage device directly chargeable from said DC output terminals through an impedance and a first controllably conductive device, said impedance carrying only charging current for said energy storage device;
   an inverter circuit having input terminals connected to said output terminals of said valley fill circuit and producing a high frequency drive voltage for driving a lamp current through said at least one gas discharge lamp when said AC input terminals are energized by said source of AC power;
   said inverter circuit being adapted to draw current from substantially only said source of AC power and through said rectifying circuit for a time which is greater than 90° of each 180° line frequency half cycle, whereby the current drawn from said source of AC power has a total harmonic distortion below 33.3%, and whereby said lamp current has a lamp current crest factor below 2.1.

2. The electronic ballast of claim 1, wherein the lamp current crest factor is less than about 1.7.

3. The electronic ballast of claim 1, which further includes a cat ear circuit connected to said source of AC power, said cat ear circuit being adapted to conduct current for a first relatively short time following a first zero crossing of said line voltage and for a second relatively short time prior to the next zero crossing of said line voltage thereby to reduce the total harmonic distortion of the current drawn from said source of AC power below that which would occur in the absence of said cat ear circuit.

4. The electronic ballast of claim 3, wherein the current drawn from said source of AC power has a total harmonic distortion below about 20%.

5. The electronic ballast of claim 3, wherein said cat ear circuit draws current from said source of AC power when the instantaneous value of said line voltage is less than a predetermined absolute value.

6. The electronic ballast of claim 3, wherein said cat ear circuit draws current from said source of AC power only when said current drawn by said inverter circuit is substantially zero.

7. The electronic ballast of claim 3, wherein said cat ear circuit draws current from said source of AC power at least when said current drawn by said inverter circuit is substantially zero.

8. An electronic ballast for driving at least one gas discharge lamp from a source of AC power which has a substantially sinusoidal line voltage at a given line frequency, comprising:
   a rectifying circuit having AC input terminals and DC output terminals; said AC input terminals connectable to the source of AC power; said rectifying circuit producing a rectified output voltage at its said DC output terminals when said AC input terminals are energized by said source of AC power;
   a valley fill circuit having input and output terminals; said input terminals of said valley fill circuit connected to said DC output terminals of said rectifying circuit;
   an inverter circuit having input terminals connected to said output terminals of said valley fill circuit and producing a high frequency drive voltage for driving a lamp current through said at least one gas discharge lamp when said AC input terminals are energized by said source of AC power;
   said inverter circuit being adapted to draw current substantially only from said source of AC power and through said rectifying circuit for a time which is greater than 90° of each 180° line frequency half cycle;
   and a cat ear circuit connected to said source of AC power, said cat ear circuit being adapted to conduct current for a first relatively short time following a first zero crossing of said line voltage and for a second relatively short time prior to the next zero crossing of said line voltage, thereby to reduce the total harmonic distortion of the current drawn from said source of AC power below 33.3%.

9. The electronic ballast of claim 8, wherein the total harmonic distortion of the current drawn from the source of AC power is below about 20%.

10. The electronic ballast of claim 8, wherein said cat ear circuit comprises a cat ear power supply.

11. The electronic ballast of claim 8, wherein said cat ear circuit draws current from said source of AC power only when said line voltage is less than a predetermined absolute value.

12. The electronic ballast of claim 8, wherein said cat ear circuit draws current from said source of AC power only when said current drawn by said inverter circuit from said source of AC power is substantially zero.

13. The electronic ballast of claim 8, wherein said cat ear circuit draws current from said source of AC power at least when said current drawn by said inverter circuit is substantially zero.

14. An electronic ballast for driving at least one gas discharge lamp from a source of AC power which has a substantially sinusoidal line voltage at a given line frequency, comprising:

a rectifying circuit having AC input terminals and DC output terminals; said AC input terminals connectable to the source of AC power; said rectifying circuit producing a rectified output voltage at its said DC output terminals when said AC input terminals are energized by said source of AC power;

a valley fill circuit having input and output terminals; said input terminals of said valley fill circuit connected to said DC output terminals of said rectifying circuit; said valley fill circuit including an energy storage device directly chargeable from said DC output terminals through an impedance and a first controllably conductive device, said impedance carrying only charging current for said energy storage device;

an inverter circuit having input terminals connected to said output terminals of said valley fill circuit and producing a high frequency drive voltage for driving a lamp current through said at least one gas discharge lamp when said AC input terminals are energized by said source of AC power;

and a valley fill control circuit coupled to said energy storage device and operable to enable said energy storage device to draw charging current from said rectifying circuit for a time greater than 90° of each 180° line frequency half cycle, whereby the current drawn from the source of AC power has a total harmonic distortion below 33.3%.

15. The electronic ballast of claim 14, wherein said valley fill control circuit includes an inductor.

16. The electronic ballast of claim 14, wherein said valley fill control circuit includes a tapped inductor.

17. The electronic ballast of claim 14, wherein said first controllably conductive device is a MOSFET.

18. The electronic ballast of claim 14, wherein said inverter circuit includes said first controllably conductive device; whereby said first controllably conductive device serves a dual purpose.

19. The electronic ballast of claim 14, wherein said inverter circuit includes series connected second and third controllably conductive devices connected across said input terminals of said inverter circuit, whereby each of the three controllably conductive devices are independent devices.

20. An electronic ballast for driving at least one gas discharge lamp which draws ballast input current from a source of AC power which has a substantially sinusoidal line voltage at a given line frequency, comprising:

a rectifying circuit having AC input terminals and DC output terminals; said AC input terminals connectable to the source of AC power; said rectifying circuit producing a rectified output voltage at its said DC output terminals when said AC input terminals are energized by said source of AC power;

a valley fill circuit having input and output terminals; said input terminals of said valley fill circuit connected to said DC output terminals of said rectifying circuit;

an inverter circuit coupled between said output terminals of said valley fill circuit and said at least one gas discharge lamp and including series connected first and second controllably conductive devices; said inverter circuit producing a high frequency drive voltage for driving a lamp current through said at least one gas discharge lamp;

an inverter control circuit coupled to and independently controlling the conduction times of said series connected first and second controllably conductive devices;

said inverter control circuit being operable to reduce the conduction time of said first controllably conductive device to produce a relatively narrow pulse and, simultaneously, increase the conduction time of said second controllably conductive device to produce a relatively wide pulse during the period around the instantaneous peak absolute voltage of each line frequency half cycle, whereby the magnitude of the envelope of said lamp current humps down below the magnitude that would occur in the absence of said changes in said conduction times, causing a reduction in the current crest factor of said lamp current, and whereby said increase in the conduction time of said second controllably conductive device causes said ballast input current to hump up above the magnitude that would occur in the absence of said increase in conduction time, causing a reduction in the total harmonic distortion of said ballast input current.

21. The electronic ballast of claim 20, wherein the lamp current has a current crest factor below 2.1.

22. The electronic ballast of claim 20, wherein the lamp current has a current crest factor below about 1.7.

23. The electronic ballast of claim 20, wherein a current only flows through said first controllably conductive device when no current flows through said second controllably conductive device and vice versa.

24. The electronic ballast of claim 20, wherein current flows alternately through said first and second controllably conductive devices.

25. The electronic ballast of claim 20, wherein a sum of said conduction times of said series connected first and second controllably conductive devices is the period of said high frequency drive voltage.

26. The electronic ballast of claim 20, wherein said valley fill circuit comprises a buck converter circuit.

27. The electronic ballast of claim 20, wherein said valley fill circuit comprises a switched resistor circuit.

28. The electronic ballast of claim 20, wherein said inverter control circuit includes a micro-controller.

29. The electronic ballast of claim 20, wherein said inverter control circuit includes a digital signal processing circuit.

30. The electronic ballast of claim 20, wherein said inverter control circuit includes an ASIC.

31. An electronic ballast for driving at least one lamp comprising:

a rectifying circuit operatively connectable to an AC line;

a current drawing circuit connected across said rectifying circuit; and an inverter circuit connected to said rectifying circuit that supplies a lamp current to said at least one lamp;

wherein said current drawing circuit draws current from said AC line when the instantaneous voltage of said AC line nears zero to reduce the total harmonic distortion of the input current drawn by said ballast, wherein said current drawing circuit is a cat ear circuit, wherein said cat ear circuit includes a monitoring circuit that actively monitors the current drawn by said inverter circuit and only draws current when said inverter circuit is not drawing current above a predetermined value.

32. An electronic ballast for driving at least one lamp comprising:

a rectifying circuit operatively connectable to an AC line;

a valley fill circuit including an energy storage device;

said valley fill circuit operable to selectively charge said energy storage device;

an inverter for providing a lamp current to said at least one lamp, said inverter including a first electronic switch series connected with a second electronic switch; and a control circuit for controlling the conduction time of said first and said second electronic switches;

wherein said first electronic switch is controlled to conduct for a relatively shorter time and said second electronic switch is controlled to conduct for a relatively longer time during the time around the time of the absolute peak voltage of said AC line whereby the total harmonic distortion of a ballast input current and the current crest factor of said lamp current is decreased.

33. The electronic ballast of claim 32, wherein said valley fill circuit comprises a buck converter circuit.

34. The electronic ballast of claim 32, wherein said valley fill circuit comprises a switched resistor circuit.

35. The electronic ballast of claim 32, wherein said control circuit includes a microprocessor.

36. The electronic ballast of claim 32, wherein said control circuit includes a digital signal processor.

37. The electronic ballast of claim 32, wherein said control circuit includes an ASIC.

38. The electronic ballast of claim 32, which further includes a flyback transformer and wherein said energy storage device is charged through said flyback transformer.

39. The electronic ballast of claim 33, wherein said buck converter circuit includes a tapped inductor.

40. An electronic ballast for driving at least one lamp comprising:

a rectifying circuit operatively connectable to an AC line;
a valley fill circuit including an energy storage device;
said valley fill circuit operable to selectively charge said energy storage device;
a back end which includes an inverter circuit that supplies a lamp current to a lamp;
a control circuit for controlling the operation of said inverter circuit; and
a cat ear circuit that supplies power to said control circuit and wherein said inverter circuit draws a first current from said AC line during a predetermined portion of each half cycle which is greater than 90° of each half cycle of said AC line,
wherein said inverter circuit draws said first current during a first portion of each said half cycle, and said cat ear circuit draws a second current from said AC line during a second substantially non-overlapping portion of each said half cycle.

41. The electronic ballast of claim 40, wherein said cat ear circuit starts drawing said second current at a predetermined fixed cut in point in each half cycle.

42. The electronic ballast of claim 40, wherein said cat ear circuit stops drawing said second current at a predetermined fixed cut out point in each half cycle.

43. The electronic ballast of claim 40, wherein said cat ear circuit includes an active back end current monitoring circuit to monitor the current drawn by said back end.

44. A method for reducing the ballast input current total harmonic distortion below 33.3% and reducing the current crest factor below 2.1 of the lamp current provided by an electronic ballast for driving at least one gas discharge lamp from a source of AC power which has a substantially sinusoidal line voltage at a given line frequency, comprising the steps of:

a) receiving the substantially sinusoidal line voltage from said source of AC power;

b) rectifying the substantially sinusoidal line voltage from said source of AC power to provide a full wave rectified voltage;

c) charging an energy storage device from said full wave rectified voltage through an impedance and a controllably conductive device to provide a DC voltage;

d) modifying the full wave rectified voltage by supplying said DC voltage between the peaks of the full wave rectified voltage to provide a valley filled voltage;

e) applying the valley filled voltage to an inverter to provide a high frequency AC voltage;

f) using said high frequency AC voltage to drive a lamp current through said at least one gas discharge lamp; and g) causing said inverter to draw current from said source of AC power for a time greater than 90° of each 180° line frequency half cycle.

45. A method of reducing the ballast input current total harmonic distortion below 33.3% in an electronic ballast for driving at least one gas discharge lamp, connectable to a source of AC power which has substantially sinusoidal line voltage at a given line frequency, comprising the steps of:

a) rectifying the sinusoidal line voltage from said source of AC power to provide full wave rectified voltage;

b) modifying the full wave rectified voltage by supplying a DC voltage between the peaks of the full wave rectified voltage to provide a valley filled voltage;

c) applying the valley filled voltage to an inverter to provide a high frequency AC voltage;

d) using said high frequency AC voltage to drive a lamp current through said at least one gas discharge lamp;

e) causing said inverter to draw current from said source of AC power through an impedance and a controllably conductive device for a time greater than 90° of each 180° line frequency half cycle; and f) drawing additional current thru a cat ear circuit from said source of AC power during a first time interval following a line voltage zero crossing and a second time interval just prior to the next line voltage zero crossing.

46. A method for reducing the ballast input current total harmonic distortion below 33.3% in an electronic ballast for driving at least one gas discharge lamp from a source of AC power which has a substantially sinusoidal line voltage at a given line frequency, comprising the steps of:

a) rectifying the substantially sinusoidal line voltage from said source of AC power to provide a full wave rectified voltage;

b) providing an energy storage device to modify the full wave rectified voltage by supplying a DC voltage between the peaks of the full wave rectified voltage to provide a valley filled voltage;

c) applying the valley filled voltage to an inverter to provide a high frequency AC voltage;

d) using said high frequency AC voltage to drive a lamp current through said at least one gas discharge lamp; and e) causing said energy storage device to draw current from said source of AC power through an impedance and a controllably conductive device for a time greater than 90° of each 180° line frequency half cycle.

47. A method for reducing the ballast input current total harmonic distortion and for reducing the current crest factor in an electronic ballast which drives at least one gas discharge lamp from a source of AC power which has a substantially sinusoidal line voltage at a given line frequency, comprising the steps of:

a) rectifying the substantially sinusoidal line voltage from said source of AC power to provide a full wave rectified voltage;

b) modifying the full wave rectified voltage by supplying a DC voltage between the peaks of the full wave rectified voltage to provide a valley filled voltage;

c) applying the valley filled voltage to an inverter having at least first and second controllably conductive devices to provide a high frequency AC voltage;

d) using said high frequency AC voltage to drive a lamp current through said at least one gas discharge lamp; and e) controlling the conduction time of said first and second controllably conductive devices to hump up said ballast input current and hump down said lamp current during the time around the time of the absolute peak voltage of said source of AC power.

* * * * *